United States Patent
Arai

(10) Patent No.: US 10,084,956 B2
(45) Date of Patent: Sep. 25, 2018

(54) IMAGING APPARATUS, AND IMAGING SYSTEM

(71) Applicant: Olympus Corporation, Hachioji-shi, Tokyo (JP)

(72) Inventor: Hirozumi Arai, Machida (JP)

(73) Assignee: Olympus Corporation, Tokyo (JP)

( * ) Notice: Subject to any disclaimer, the term of this patent is extended or adjusted under 35 U.S.C. 154(b) by 65 days.

(21) Appl. No.: 15/203,403

(22) Filed: Jul. 6, 2016

(65) Prior Publication Data

US 2016/0316139 A1 Oct. 27, 2016

Related U.S. Application Data

(63) Continuation of application No. PCT/JP2015/059216, filed on Mar. 25, 2015.

(30) Foreign Application Priority Data

Sep. 10, 2014 (JP) .................. 2014-183961

(51) Int. Cl.
*H04N 5/222* (2006.01)
*H04N 5/232* (2006.01)
*G03B 17/18* (2006.01)

(52) U.S. Cl.
CPC ......... *H04N 5/23222* (2013.01); *G03B 17/18* (2013.01); *H04N 5/23203* (2013.01);
(Continued)

(58) Field of Classification Search
CPC ........... H04N 5/23222; H04N 5/23245; H04N 5/23203; H04N 5/23216; G03B 17/18
(Continued)

(56) References Cited

U.S. PATENT DOCUMENTS

2007/0188647 A1  8/2007 Ikeda
2007/0200945 A1* 8/2007 Inukai ............... G03B 17/18
                                                   348/333.02
(Continued)

FOREIGN PATENT DOCUMENTS

CN   101030016   9/2007
CN   102891717   1/2013
(Continued)

OTHER PUBLICATIONS

First Office Action from corresponding Japanese Patent Application No. 2016-501689, dated Feb. 21, 2017 (3 pgs.), with translation (3 pgs.).

(Continued)

*Primary Examiner* — Yogesh Aggarwal
(74) *Attorney, Agent, or Firm* — John C. Pokotylo; Pokotylo Patent Services

(57) ABSTRACT

According to the present invention, an imaging apparatus includes: a screen generating unit which generates a help screen by displaying allocation parameter corresponding to each of operation units on an operation unit layout drawing indicating positions of the operation units on the basis of a parameter database showing the operation unit allocated to each of the allocation parameters; and a display change judgment unit which judges whether to change the display state of the operation unit layout drawing, wherein the screen generating unit changes the angle of the operation unit layout drawing when there are operation unit layout drawings drawn from different angles and when the display change judgment unit judges to change the display state.

7 Claims, 16 Drawing Sheets

(52) U.S. Cl.
CPC ..... *H04N 5/23216* (2013.01); *H04N 5/23245* (2013.01); *H04N 5/23293* (2013.01)

(58) Field of Classification Search
USPC ........................................ 348/333.01–333.09
See application file for complete search history.

(56) References Cited

U.S. PATENT DOCUMENTS

| | | | | |
|---|---|---|---|---|
| 2013/0251361 | A1* | 9/2013 | Azadeh | ............... H04B 10/075 398/22 |
| 2014/0085233 | A1 | 3/2014 | Sudo | |

FOREIGN PATENT DOCUMENTS

| | | |
|---|---|---|
| JP | 8-339020 | 12/1996 |
| JP | 2003-319211 | 11/2003 |
| JP | 2007-221371 | 8/2007 |
| JP | 2010-187200 | 8/2010 |
| JP | 2012-034300 | 2/2012 |
| JP | 2012-123079 | 6/2012 |
| JP | 2013-239785 | 11/2013 |
| JP | 2014-42164 | 3/2014 |

OTHER PUBLICATIONS

International Search Report to International Patent Application No. PCT/JP2015/059216, dated Jun. 23, 2015 (3 pgs.) with translation (2 pgs.).

Written Opinion of the International Searching Authority to International Patent Application No. PCT/JP2015/059216, dated Jun. 23, 2015 (4 pgs.).

English translation of International Preliminary Report on Patentability), including the Written Opinion of the International Searching Authority, to International Patent Application No. PCT/JP2015/059216, dated Mar. 25, 2015 (8 pgs.).

First Office Action to corresponding Chinese Patent Application No. 201580006519.3, dated May 22, 2018 (7 pgs.), with translation (17 pgs.).

\* cited by examiner

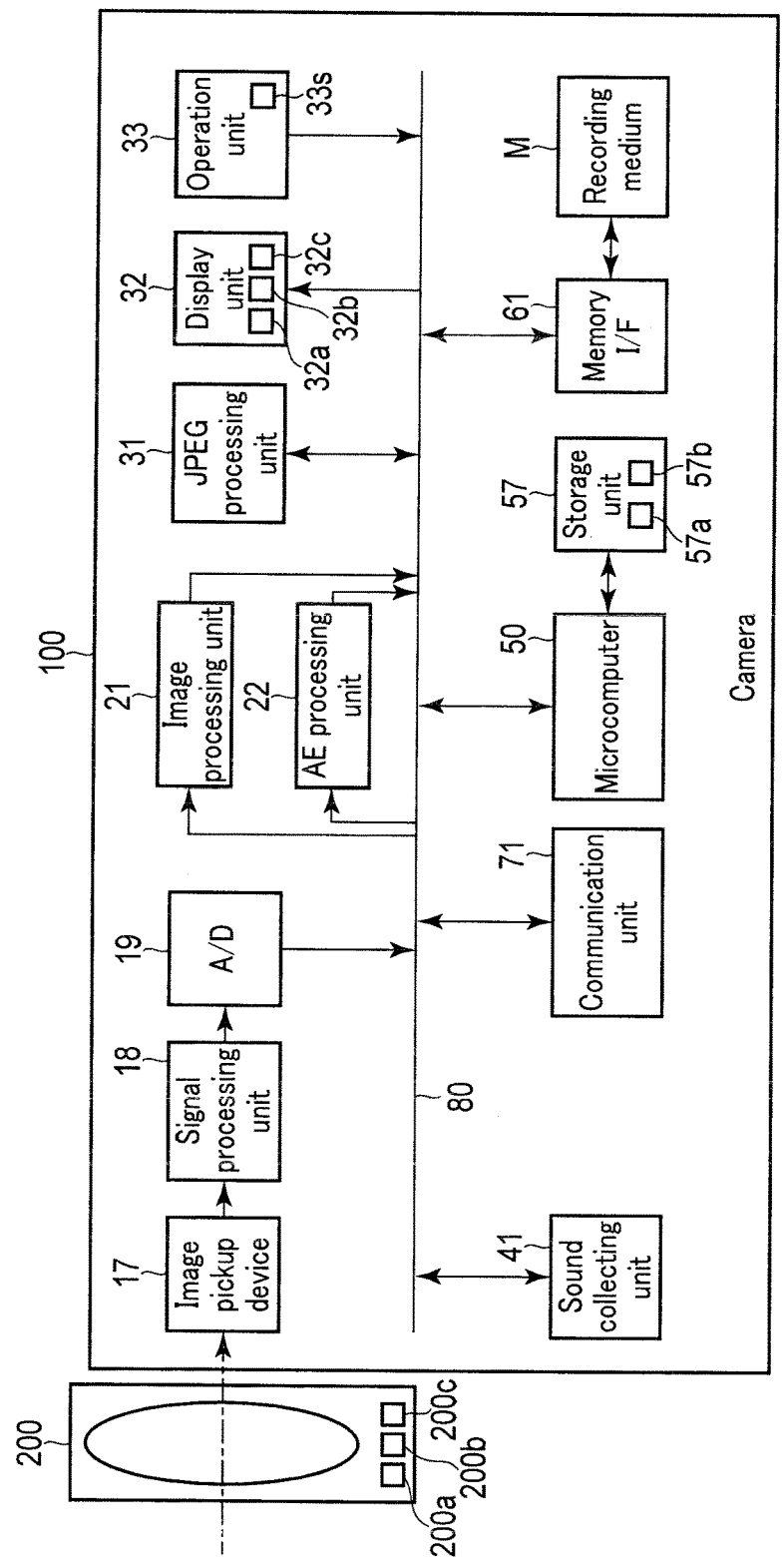
F I G. 1

| Parameter | Operation yes/no | Corresponding operation unit | Corresponding button layout drawing | Display position |
|---|---|---|---|---|
| Aperture value | Yes | Front dial | Front/right side/rear | ... |
| Shutter speed | No | — | — | ... |
| Exposure value | Yes | Rear dial | Front/right side/rear | ... |

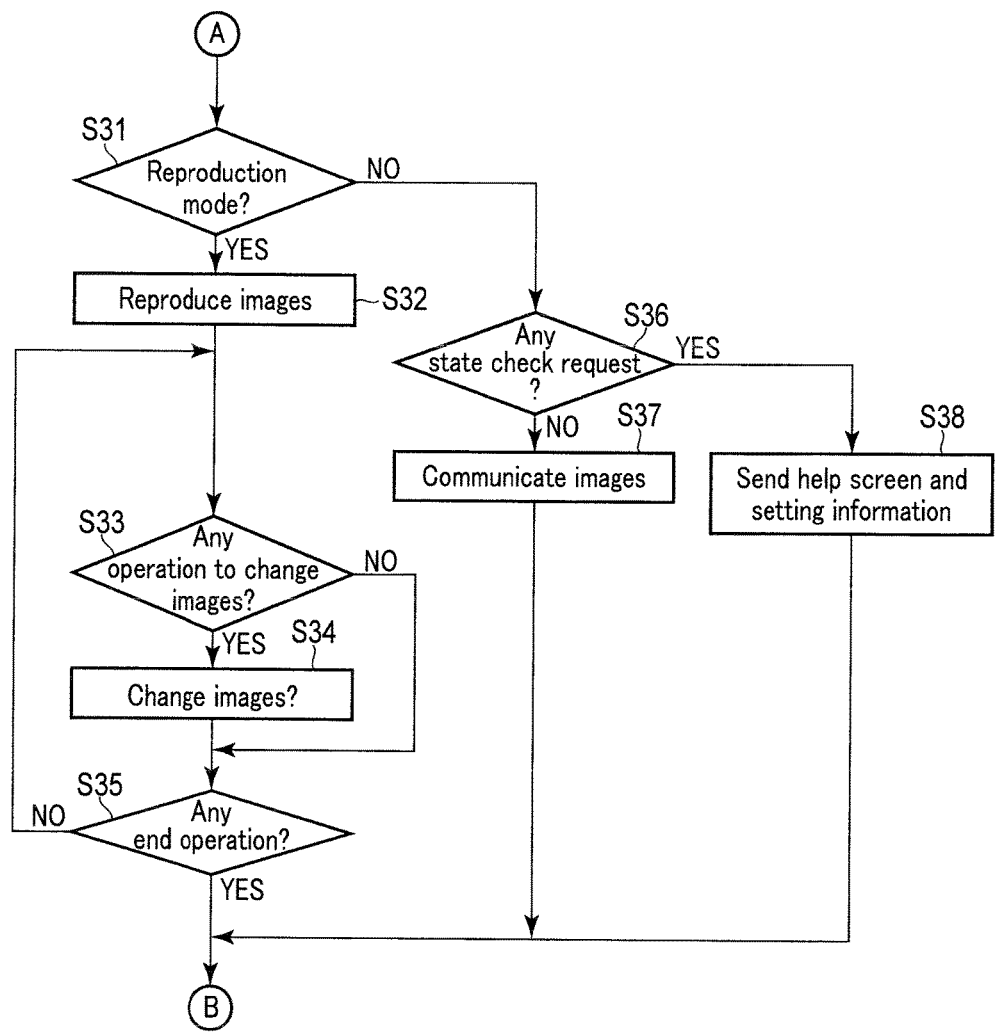
F I G. 10

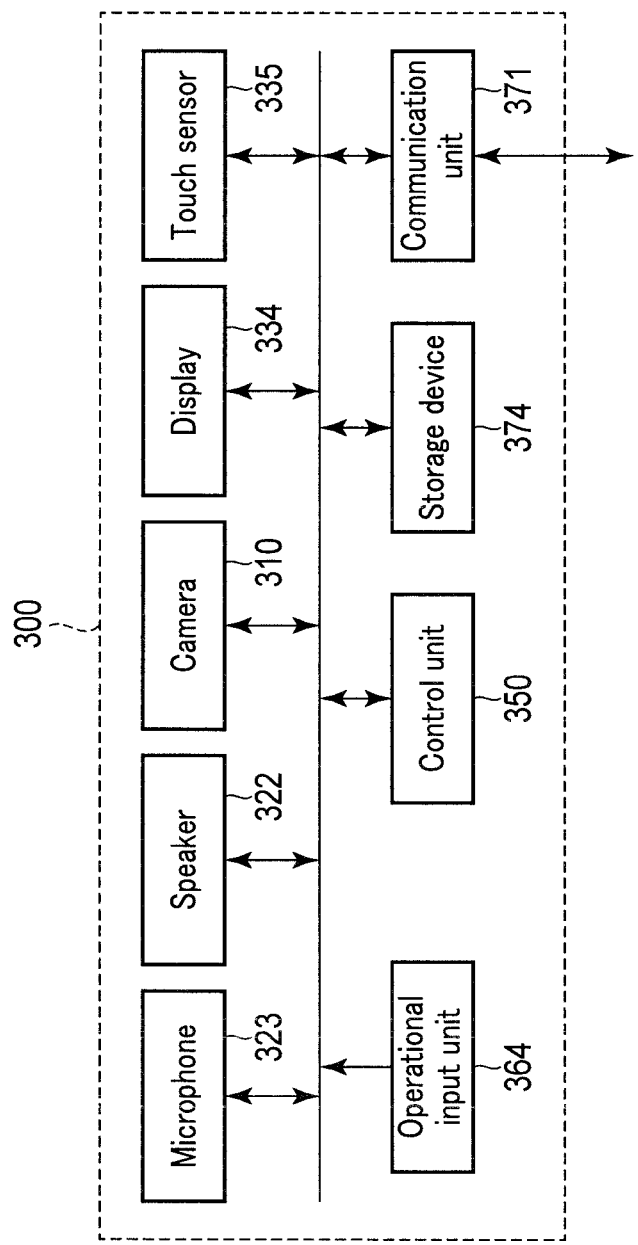
F I G. 11

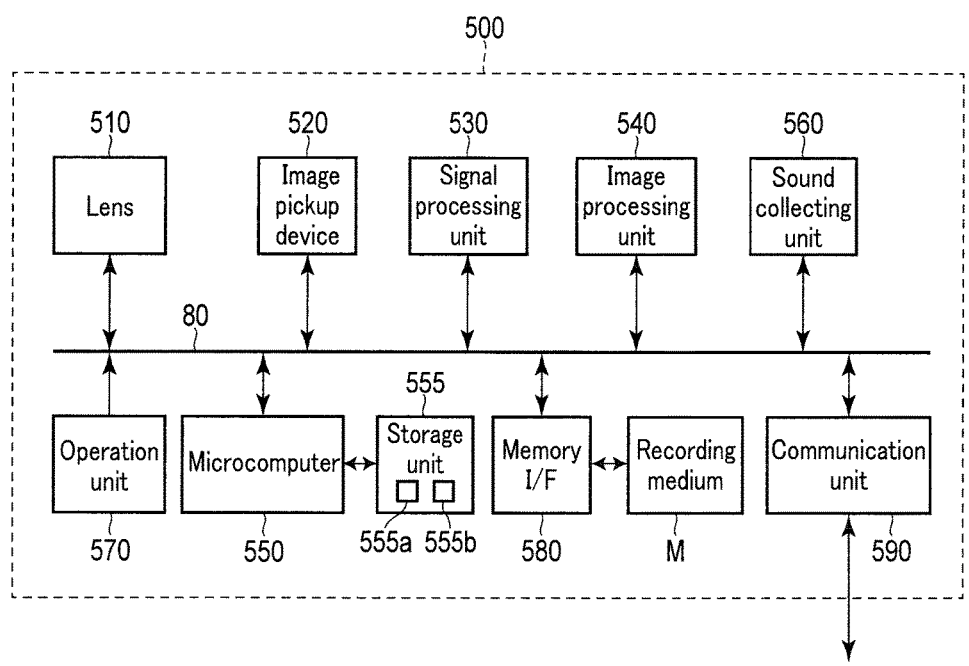
F I G. 15

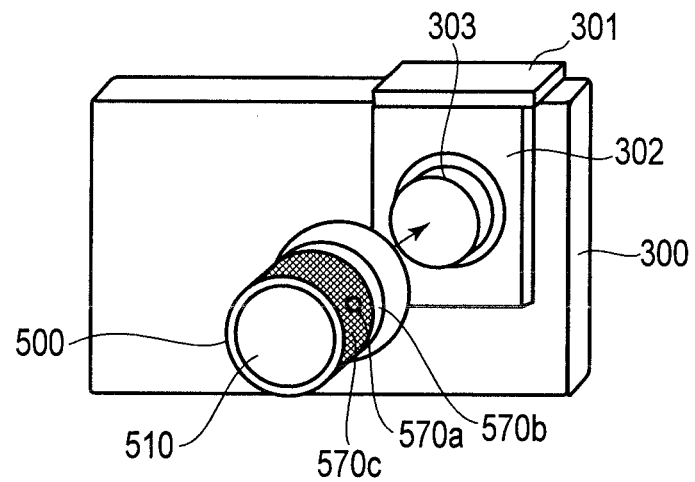
F I G. 16
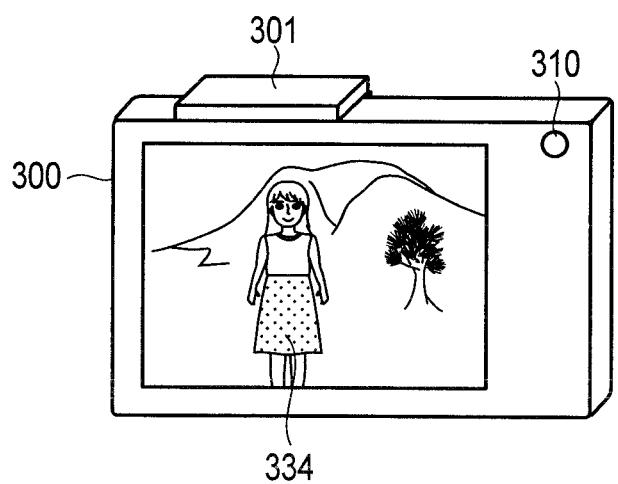
F I G. 17

IMAGING APPARATUS, AND IMAGING SYSTEM

CROSS-REFERENCE TO RELATED APPLICATIONS

This application is a Continuation Application of PCT Application No. PCT/JP2015/059216, filed Mar. 25, 2015 and based upon and claiming the benefit of priority from Japanese Patent Application No. 2014-183961, filed Sep. 10, 2014, the entire contents of all of which are incorporated herein by reference.

BACKGROUND OF THE INVENTION

1. Field of the Invention

The present invention relates to an imaging apparatus, and an imaging system.

2. Description of the Related Art

An imaging apparatus generally comprises an image pickup device which acquires an image on the basis of light, an optical system such as a lens which forms the light into an image on the image pickup device, and, for example, a liquid crystal or organic EL display device. The imaging apparatus comprises operation units to which functions for changing set values of parameters regarding imaging such as an aperture value (F value), a shutter speed (SS), ISO sensitivity, and an exposure value (Ev value) can be allocated.

For example, Jpn. Pat. Appln. KOKAI Publication No. 8-339020 and Jpn. Pat. Appln. KOKAI Publication No. 2003-319211 each disclose an apparatus which displays an exterior drawing of equipment, an operational procedure, and others on a display device for a user to recognize the same.

There has been a widespread imaging apparatus comprising operation units to which the aforementioned functions for changing parameters for imaging can be freely allocated. Such an imaging apparatus allows the functions to be allocated to the operation units suitably to individual preference, but the problem is that the user needs to recognize the function allocated to a certain operation unit. For example, when there is a function that is not frequently used, when the allocation of the favorite function has been changed, or when the functions allocated to the operation units have been changed, there is a possibility that the user does not fully recognize the functions allocated to the operation units. In this case, the problem is that instantaneously operating the imaging apparatus as intended by the user is more difficult, which may lead to deterioration of convenience.

BRIEF SUMMARY OF THE INVENTION

The present invention is intended to provide an imaging apparatus, and an imaging system which do not deteriorate convenience even if functions for operation units are changed.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram illustrating an example of a control system of an imaging apparatus according to one embodiment;

FIG. 10 is a diagram illustrating an example of the operation of the imaging apparatus according to one embodiment;

FIG. 11 is a diagram illustrating an example of the configuration of a portable terminal according to one embodiment;

FIG. 15 is a diagram illustrating an example of the configuration of a lens-type imaging apparatus according to one embodiment;

FIG. 16 is a diagram illustrating an example of a portable terminal to which the lens-type imaging apparatus is attached according to one embodiment;

FIG. 17 is a diagram illustrating an example of the portable terminal to which the lens-type imaging apparatus is attached according to one embodiment;

DETAILED DESCRIPTION OF THE INVENTION

Hereinafter, an imaging apparatus, a control method of the imaging apparatus, and an imaging system according to one embodiment will be described in detail with reference to the drawings.

First Embodiment

Figure 2:
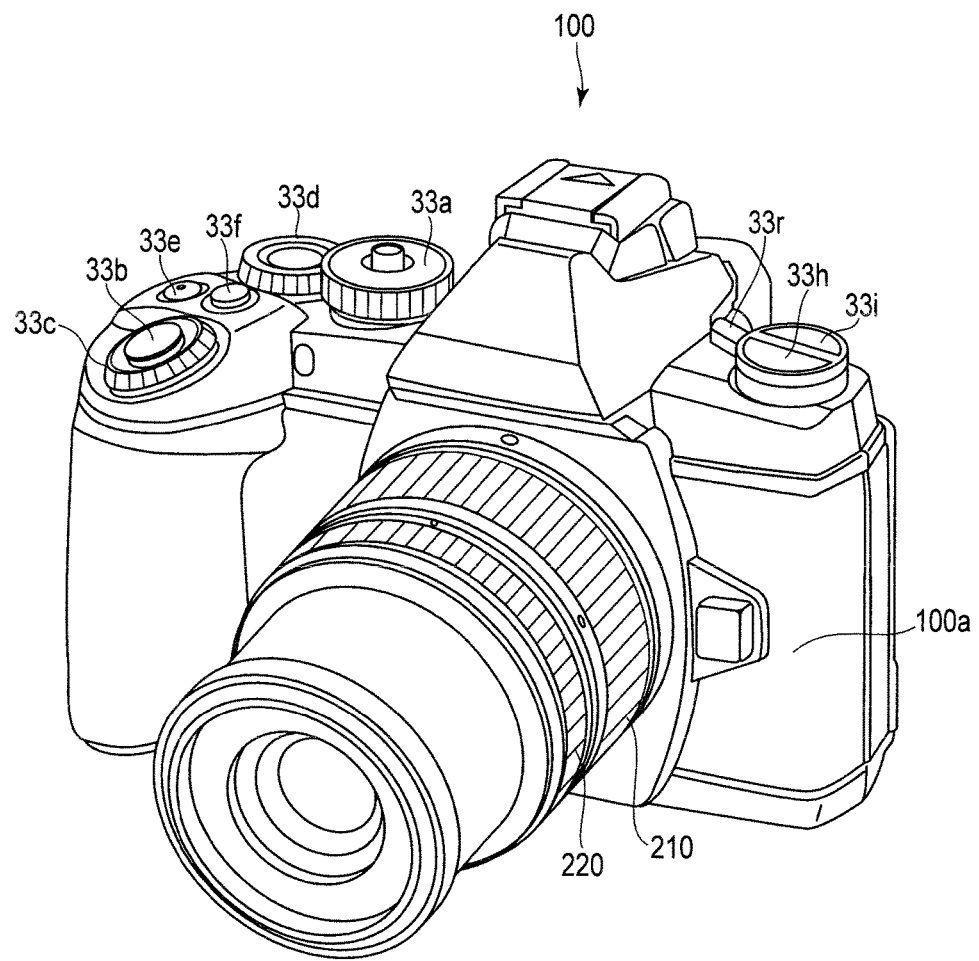
FIG. 2 is a diagram illustrating an example of the exterior of the imaging apparatus according to one embodiment.
Figure 3:
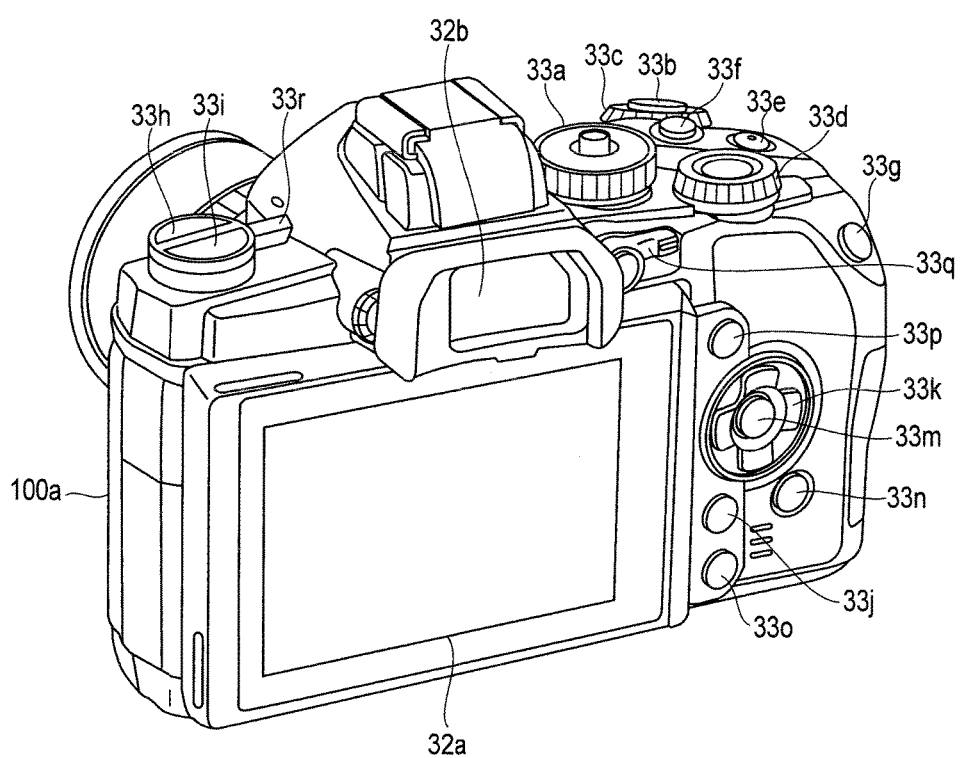
FIG. 3 is a diagram illustrating an example of the exterior of the imaging apparatus according to one embodiment.

FIG. 1 shows an example of a control system of an imaging apparatus 100, and an imaging system 1 including the imaging apparatus 100. FIG. 2 and FIG. 3 show an example of the exterior of the imaging apparatus 100.

The imaging apparatus 1 includes the imaging apparatus 100 and an interchangeable lens (hereinafter referred to as a lens 200). The imaging system 1 may further include, for example, a tablet PC, a smartphone, or a slate PC (portable terminal) 300 such as a PC in which an input device such as a keyboard is combined with a slate-shaped display device.

The imaging apparatus 100 and the slate PC 300 can communicate with each other in a wired or wireless manner. The imaging apparatus 100 can, for example, perform an imaging operation and change various parameters under the control of the slate PC 300. Moreover, the slate PC 300 can reproduce images or moving images stored in a recording medium in the imaging apparatus 100.

The imaging apparatus 100 acquires a subject figure which has passed through the lens 200 as an image by an image pickup device. The imaging apparatus 100 also comprises a function of live-view display (or through-image display) to display the image on a display device such as a liquid crystal monitor or an organic EL display in real time. The imaging apparatus 100 can save the image in the recording medium when a shutter button 33b is fully pressed.

The imaging apparatus 100 comprises an image pickup device 17, a signal processing unit 18, an analog-digital converter (A/D) 19, an image processing unit 21, an AE processing unit 22, a jpeg processing unit 31, a display unit 32, an operation unit 33, a sound collecting unit 41, a microcomputer 50, a storage unit 57, a memory interface (I/F) 61, and a communication unit 71.

The A/D 19, the image processing unit 21, the AE processing unit 22, the jpeg processing unit 31, the display unit 32, the operation unit 33, the sound collecting unit 41, the microcomputer 50, the memory I/F 61, and the communication unit 71 are connected to one another via a data bus 80.

The imaging apparatus 100 also comprises an unshown mount to which the interchangeable lens can be attached. A contact terminal is provided on the mount. This contact terminal permits the imaging apparatus 100 to communicate with the lens 200 attached to the mount. As a result, the imaging apparatus 100 can acquire various information regarding the lens 200 such as a focal distance and an aperture value from the lens 200.

The lens 200 receives light, and forms the received light into an image on the image pickup device 17. The lens 200 comprises an optical system 200a which is a combination of lenses, a CPU 200b, and a ROM 200c.

Furthermore, as shown in FIG. 2, the lens 200 comprises a first operation ring 210 and a second operation ring 220. Parameters for imaging such as an in-focus distance, a focal distance, and an aperture value (F value) can be allocated to the first operation ring 210 and the second operation ring 220, respectively.

The optical system 200a includes, for example, a lens for focusing, a lens for zooming, and a diaphragm blade. The lens 200 drives a lens for in-focus of the optical system 200a under the control of the microcomputer 50 of the imaging apparatus 100. When the in-focus distance is allocated to the first operation ring 210 or the second operation ring 220, the lens 200 can drive the lens for focusing in response to the operation of the first operation ring 210 or the second operation ring 220 to change the in-focus distance.

When the focal distance is allocated to the first operation ring 210 or the second operation ring 220, the lens 200 can drive the lens for zooming in response to the operation of the first operation ring 210 or the second operation ring 220 to change the focal distance.

When the aperture value is allocated to the first operation ring 210 or the second operation ring 220, the lens 200 can drive the diaphragm blade in response to the operation of the first operation ring 210 or the second operation ring 220 to change the aperture value.

The lens 200 may be configured to change zooming, focusing, and the aperture value on the basis of a control signal received from the imaging apparatus 100 via the mount.

The imaging apparatus 100 may have a configuration in which the lens 200 is incorporated in a housing 100a of the imaging apparatus, instead of the configuration in which the lens 200 is attached via the mount.

The image pickup device 17 is provided in the rear part to which the lens 200 is attached (inside the housing 100a of the imaging apparatus 100). The image pickup device 17 comprises a pixel array in which pixels for photoelectrically converting the subject figure that has passed through the lens 200 are two-dimensionally arrayed. Each of the pixels of the image pickup device 17 can photoelectrically convert the light that has passed through the lens 200 and store a charge. The image pickup device 17 is, for example, a charge coupled device (CCD), a complementary metal oxide semiconductor (CONS), or some other two-dimensional image pickup device.

The signal processing unit 18 subjects a signal output from the image pickup device 17 to signal processing. For example, the signal processing unit 18 reads the charge stored in each of the pixels of the image pickup device 17. That is, the signal processing unit 18 reads an image generated by the image pickup device 17. Further, the signal processing unit 18 subjects the read image to signal processing such as analog amplification, and outputs the signal-processed signal to the A/D 19.

The A/D 19 quantizes the signal supplied from the signal processing unit 18, and acquires image data. The A/D 19 outputs the image data to, for example, the image processing unit 21, the AE processing unit 22, and the jpeg processing unit 31 under the control of the microcomputer 50. That is, an imaging unit is constituted by, for example, the lens 200, the image pickup device 17, the signal processing unit 18, and the A/D 19. The imaging unit is supported by the housing 100a.

The image processing unit 21 subjects the image data digitized by the A/D 19 to various image processing such as color correction, gamma (γ) correction, contrast correction, monochrome/color mode processing, and live-view image processing.

The AE processing unit 22 uses the image data digitized by the A/D 19 to acquire subject luminance information for use in, for example, exposure control. The imaging apparatus 100 controls ISO sensitivity (ISO), an aperture value, and a shutter speed (SS) corresponding to an exposure value (Ev value) on the basis of the subject luminance information.

The jpeg processing unit 31 compresses the image data digitized by the A/D 19 in a jpeg format, and generates image data in the jpeg format (jpeg data). The jpeg processing unit 31 outputs the jpeg data to a recording medium M attached to the memory I/F 61 under the control of the microcomputer 50. Thus, the imaging apparatus 100 can save the jpeg data on the obtained image in the recording medium M.

Figures 4, 5:
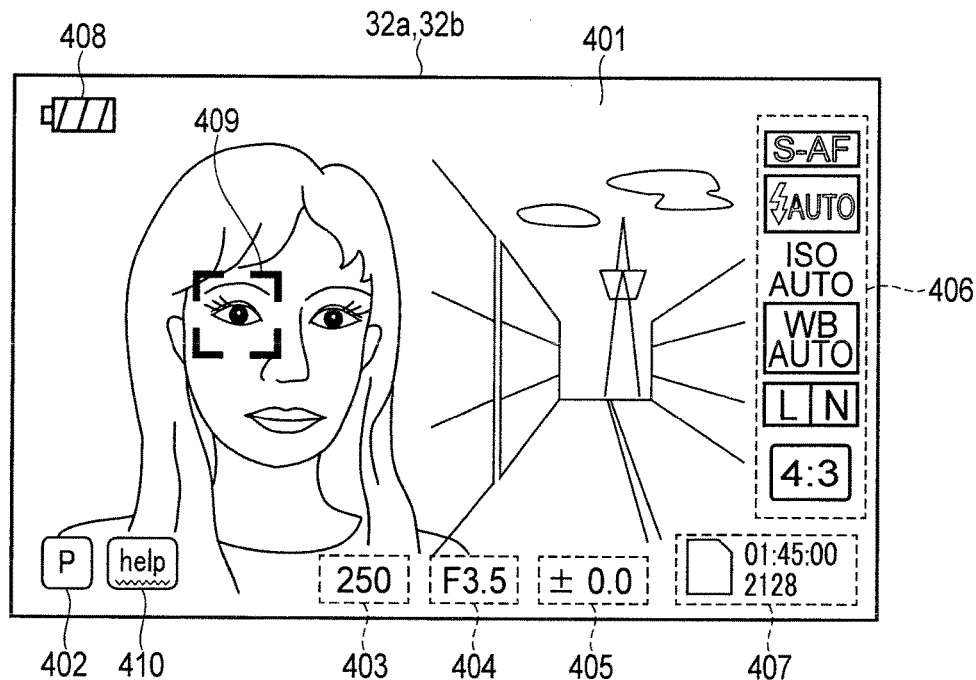
FIG. 4 is a diagram illustrating a display example of the imaging apparatus according to one embodiment.
FIG. 5 is a diagram illustrating an example of information to be stored in a storage unit of the imaging apparatus according to one embodiment.

The display unit 32 is a module which displays various information under the control of the microcomputer 50. As shown in FIG. 4 and FIG. 5, the display unit 32 comprises a display device, and a drive circuit which displays screens on the display device on the basis of the data. The display unit 32 comprises, for example, a liquid crystal monitor 32a provided on the rear surface of the housing 100a, an electronic viewfinder (EVF) 32b provided in a finder unit of the housing 100a, and an eyepiece sensor 32c which detects whether a photographer is looking through the finder unit. The display unit 32 may be configured to comprise, on the rear surface of the housing 100a, some other display device such as an organic EL display instead of the liquid crystal monitor 32a. The EVF 32b comprises a configuration in which a display device such as a liquid crystal monitor or an organic EL display is combined with an eyepiece optical system.

When detecting that the photographer is looking through the finder unit, the display unit 32 turns off the display of the liquid crystal monitor 32a, and allows the display by the EVF 32b. When detecting that the photographer is not looking through the finder unit, the display unit 32 turns off the display of the EVF 32b, and allows the display by the liquid crystal monitor 32a.

The display unit 32 can perform a live-view display of the image data acquired by the image pickup device 17 on the liquid crystal monitor 32a or the EVF 32b. To this end, the microcomputer 50 generates image data (through-images) which has been subjected to image processing for a live-view display by the image processing unit 21. The microcomputer 50 controls the image processing unit 21 to supply the through-images to the display unit 32.

Furthermore, the microcomputer 50 generates OSD data for displaying on-screen displays (OSD) including indications such as various icons and characters on the display device of the display unit 32 on the basis of, for example, various setting information and the state of the imaging apparatus 100. The microcomputer 50 supplies the OSD data to the display unit 32.

For example, the microcomputer 50 generates OSD data for displaying, on the display device of the display unit 32, for example, a photography mode of the imaging apparatus 100, various setting information, a battery remaining capacity, the number of photographs that can be taken, the time of possible photography, and an AF area. The microcomputer 50 controls the display unit 32 to superimpose an OSD display based on the OSD data on the through-images.

The display unit 32 displays a screen on the liquid crystal monitor 32a or the EVF 32b under the control of the microcomputer 50. That is, the display unit 32 displays the OSD display superimposed on the through-images on the liquid crystal monitor 32a or the EVF 32b.

The operation unit 33 includes various operational buttons and dials for receiving operations by the user of the imaging apparatus 100. That is, the operation unit 33 is constituted by operation units to which the parameters for imaging are respectively allocated as allocation parameters. The microcomputer 50 functions as a parameter control unit which controls the set values of the allocation parameters on the basis of the various operational buttons of the operation unit 33 and dial operations. The set values of the parameters represent set values such as the F value, the SS, the ISO sensitivity, and the Ev value. The microcomputer 50 can control set values such as the F value, the SS, the ISO sensitivity, and the Ev value on the basis of the various operational buttons of the operation unit 33 and dial operations.

As shown in FIG. 2 and FIG. 3, the operation unit 33 comprises, for example, a mode dial 33a, the shutter button 33b, a front dial 33c, a rear dial 33d, a movie button 33e, a first function button 33f, a second function button 33g, a third function button 33h, a fourth function button 33i, a menu button 33j, a cross button 33k, an OK button 33m, a reproduction button 33n, an erase button 33o, an info button 33p, a switch lever 33q, and a power supply switch 33r.

The mode dial 33a is an operation unit for the imaging apparatus 100 to switch photography modes. The imaging apparatus 100 has photography modes such as an aperture priority mode (A mode), a shutter speed priority mode (S mode), and a manual mode (M mode). The imaging apparatus 100 can switch between the A mode, the S mode, and the M mode in response to the operation of the mode dial 33a.

The A mode is a photography mode in which the operator (photographer) of the imaging apparatus 100 decides an aperture value. When an aperture value is decided by an operational input, the imaging apparatus 100 automatically sets a shutter speed so that a correct exposure will be obtained.

The S mode is a photography mode in which the photographer decides a shutter speed. When a shutter speed is decided by an operational input, the imaging apparatus 100 automatically sets an aperture value so that a correct exposure will be obtained.

The M mode is a photography mode in which the photographer decides an aperture value and a shutter speed. The imaging apparatus 100 performs photography on the basis of the shutter speed and the aperture value decided by an operational input.

The shutter button 33b is a button for the imaging apparatus 100 to perform a release operation and an autofocus (AF) operation. For example, when the shutter button 33b is pressed halfway, the imaging apparatus 100 performs the autofocus operation. That is, the imaging apparatus 100 outputs a control signal to the lens 200 so that the lens 200 is focused on a target in an AF area.

For example, when the shutter button 33b is fully pressed, the imaging apparatus 100 performs photography. That is, the imaging apparatus 100 generates a charge by the image pickup device 17 on the basis of the setting information, generates image data by the signal processing unit 18 and the A/D 19 in accordance with the generated charge, converts the image data into jpeg data by the jpeg processing unit 31, and saves the jpeg data in the recording medium M attached to the memory I/F 61. The imaging apparatus 100 may also be configured to save, for example, both the jpeg data and the image data converted by the A/D 19 in the recording medium M attached to the memory I/F 61.

The front dial 33c and the rear dial 33d are operation units which perform functions for changing the allocated parameters. Each of the front dial 33c and the rear dial 33d is provided in an infinitely rotatable state. One of parameters such as the aperture value, the shutter speed, ISO, white balance (WB), and the exposure value is allocated to each of the front dial 33c and the rear dial 33d. The imaging apparatus 100 changes the allocated parameters in accordance with the rotations of the front dial 33c and the rear dial 33d.

The movie button 33e is a button for the imaging apparatus 100 to perform moving image photography. When the movie button 33e is pressed, the imaging apparatus 100 starts the photography for moving images. When the movie button 33e is pressed during the moving image photography, the imaging apparatus 100 stops the photography for moving images, and saves moving image data in the recording medium M attached to the memory I/F 61.

The first function button 33f, the second function button 33g, the third function button 33h, and the fourth function button 33i are operation units that are configured so that the functions for changing the set values of the parameters for imaging can be allocated to these operation units. The microcomputer 50 changes the parameters (allocation parameters) to be allocated to the first function button 33f, the second function button 33g, the third function button 33h, and the fourth function button 33i. As parameters for imaging, the imaging apparatus 100 further has, for example, color tones, WB, an AF mode, recording image quality, an aspect ratio, a continuous shooting speed, a high dynamic range (HDR), and a photometry mode. One of these parameters is allocated to each of the first function button 33f, the second function button 33g, the third function button 33h, and the fourth function button 33i.

The imaging apparatus 100 can perform the function for changing the set value of each of the allocated parameters in response to the operations of the first function button 33f, the second function button 33g, the third function button 33h, and the fourth function button 33i.

The menu button 33j is a button for the imaging apparatus 100 to open a menu screen. When the menu button 33j is pressed, the imaging apparatus 100 displays the menu screen on the liquid crystal monitor 32a or the EVF 32b.

The cross button 33k is a button for receiving up-down right-left operations by the user (photographer). For example, the imaging apparatus 100 can move the AF area in response to the operation of the cross button 33k. The cross button 33k comprises the OK button 33m in its center. The imaging apparatus 100 can switch selection items in the menu in response to the operation of the cross button 33k while the menu screen is displayed on the liquid crystal monitor 32a or the EVF 32b. The imaging apparatus 100 can also change various setting information in response to the operation of the OK button 33m. The user can change various photography parameters and settings by such button operations.

The reproduction button 33n is a button for the imaging apparatus 100 to reproduce images and moving images recorded in the recording medium M. When the reproduction button 33n is pressed, the imaging apparatus 100 displays, on the liquid crystal monitor 32a or the EVF 32b, a reproduction screen for displaying the images or moving images saved in the recording medium M. The imaging apparatus 100 can switch the images or moving images to be displayed in response to the operation of the cross button 33k while the reproduction screen is displayed on the liquid crystal monitor 32a or the EVF 32b.

The erase button 33o is a button for the imaging apparatus 100 to erase the images and moving images recorded in the recording medium M. When the erase button 33o is pressed while the images or moving images are being displayed, the imaging apparatus 100 erases the images or moving images saved in the recording medium M.

The info button 33p is a button for switching the OSD display to be displayed on the liquid crystal monitor 32a or the EVF 32b. For example, whenever the info button 33p is operated, the imaging apparatus 100 switches so that the through-image alone is displayed on the liquid crystal monitor 32a or the EVF 32b, so that the through-images on which a simple OSD display is superimposed are displayed on the liquid crystal monitor 32a or the EVF 32b, or so that the through-images on which a detailed OSD display is superimposed are displayed on the liquid crystal monitor 32a or the EVF 32b.

The switch lever 33q is a switch for switching the parameters allocated to the front dial 33c and the rear dial 33d. The switch lever 33q has two states: a "lever 1" and a "lever 2". For example, the imaging apparatus 100 respectively allocates the aperture value and the shutter speed to the front dial 33c and the rear dial 33d when the switch lever 33q is in the state "lever 1", and the imaging apparatus 100 respectively allocates the ISO and the WB to the front dial 33c and the rear dial 33d when the switch lever 33q is in the state "lever 2". The parameters to be allocated to the front dial 33c and the rear dial 33d in accordance with the state of the switch lever 33q are not limited to the parameters described above, and may be any parameters.

The power supply switch 33r is a switch for switching on and off the electric power supply of the imaging apparatus 100.

Furthermore, the operation unit 33 may be configured to comprise a touch sensor 33s which is formed integrally with the liquid crystal monitor 32a of the display unit 32. The touch sensor 33s is, for example, a resistive film type touch sensor or a capacitance type touch sensor. The imaging apparatus 100 may be configured to display various parameters on the liquid crystal monitor 32a of the display unit 32 so that the various parameters are changeable, and change these parameters in response to an operational input on the touch sensor 33s.

FIG. 4 shows an example of a live-view display including a through-image which is displayed by the display unit 32.

The live-view display includes, for example, through-image 401, an icon 402 which indicates a photography mode, an indicator 403 which indicates the shutter speed, an indicator 404 which indicates the aperture value, an indicator 405 which indicates the exposure value, an icon group 406 which indicates various setting information (parameters for imaging), an indicator 407 which indicates the number of photographs that can be taken and the time of possible photography, an indicator 408 which indicates a battery remaining capacity, an indicator 409 which indicates the AF area, and an icon 410 for calling a help screen.

The microcomputer 50 sequentially updates the screen to be displayed on the display device of the display unit 32 in accordance with the operation by the operation unit 33, the image acquired by the image pickup device 17, and the internal state of the imaging apparatus 100.

The help screen is a screen which shows the front dial 33c and the rear dial 33d as well as the parameters allocated to the first function button 33f, the second function button 33g, the third function button 33h, and the fourth function button 33i. An example of the help screen will be described later.

The sound collecting unit 41 comprises a stereo microphone for acquiring sound during the photography for moving images. The sound collecting unit 41 can acquire stereo sound by the stereo microphone. The sound collecting unit 41 can also acquire monaural sound by the stereo microphone.

The microcomputer 50 is a control unit which controls various operations of the imaging apparatus 100. The microcomputer 50 comprises, for example, a CPU and a cache memory. The storage unit 57 stores, for example, programs for controlling the imaging apparatus 100, programs for enabling various functions, and various setting information. The CPU is a computing element which executes various computing processing. The cache memory transitorily stores data read by the CPU as a result of the computation by the CPU. In accordance with an operation signal supplied from the operation unit 33, the microcomputer 50 executes the programs stored in the storage unit 57, and controls various operations of the imaging apparatus 100.

For example, the microcomputer 50 executes the programs to function as a photography control unit, a display control unit, an image processing control unit, an operation judgment unit, a communication control unit, and a parameter control unit. When functioning as the photography control unit, the microcomputer 50 controls imaging processing in accordance with an operational input or a control signal received from the slate PC 300. When functioning as the display control unit, the microcomputer 50 controls display processing by the display unit 32. When functioning as the image processing control unit, the microcomputer 50 controls image processing by the image processing unit 21, the AE processing unit, and the jpeg processing unit. When functioning as the operation judgment unit, the microcomputer 50 judges the operation input by the operation unit 33, and recognizes the control signal input from the slate PC 300 via the communication unit 71. When functioning as the communication control unit, the microcomputer 50 controls communication processing by the communication unit 71. When functioning as the parameter control unit, the microcomputer 50 controls the change of the parameters in accordance with an operational input or a control signal received from the slate PC 300.

The memory I/F 61 controls the input and output of data between the recording medium M and each unit of the imaging apparatus 100. The memory I/F 61 comprises, for example, a card slot into which the recording medium M can be inserted. The recording medium M comprises contact terminals. The memory I/F 61 also comprises contact terminals which are electrically connected to the contact terminals of the recording medium M when the recording medium M is inserted in the card slot. Thus, the imaging apparatus 100 can save data in the recording medium M and read data from the recording medium M.

The communication unit 71 is a module which performs various data communications with the slate PC 300. The communication unit 71 can communicate with the slate PC 300 by, for example, a wireless LAN or Bluetooth (registered trademark). The communication unit 71 may be configured to communicate with the slate PC 300 via a network such as an intranet by the wireless LAN when the slate PC 300 is connected to the network. The imaging apparatus 100 can communicate with the slate PC 300 or various other devices by the communication unit 71.

The storage unit 57 comprises a first storage area 57a and a second storage area 57b. The first storage area 57a previously stores drawings (button layout drawings) showing the positions of various buttons and dials on the exterior of the imaging apparatus 100. The first storage area 57a previously stores more than one button layout drawing in which the imaging apparatus 100 is viewed from more than one angle. For example, the first storage area 57a previously stores a button layout drawing in which the imaging apparatus 100 is viewed from the front side and a button layout drawing in which the imaging apparatus 100 is viewed from the rear side. Moreover, the first storage area 57a previously stores more than one button layout drawing in which the imaging apparatus 100 is drawn from different angles in stages from the front side to the rear side.

The imaging apparatus 100 switches these button layout drawings in accordance with operations and displays the button layout drawings on the display unit 32, and can thereby display the button layout drawings so that button layout drawings rotate in accordance with the operations.

The second storage area 57b stores a parameter database (parameter DB) in which information indicating whether there has been any operation (operation yes/no), an operation unit that corresponds (corresponding operation unit), a button layout drawing that corresponds (corresponding button layout drawing), and a position on the button layout drawing (operation unit position) is associated with each of the various parameter names regarding imaging.

FIG. 5 is a diagram showing an example of the parameter DB. The changeable parameters vary according to the photography modes. Therefore, the second storage area 57b comprises a parameter DB, for example, for each photography mode. FIG. 5 shows an example of a parameter DB in the case where the photography mode of the imaging apparatus 100 is the A mode.

The "operation yes/no" is information indicating whether an associated parameter is a parameter which can be changed in the photography mode corresponding to the parameter DB. The "corresponding operation unit" is information indicating an operation unit to which the associated parameter is allocated. The "corresponding button layout drawing" is information indicating a button layout drawing which is used when the associated "corresponding operation unit" is displayed in the aforementioned help screen. The "operation unit position" is information indicating a position (e.g. coordinates) on the button layout drawing shown by the "corresponding button layout drawing" of the associated "corresponding operation unit".

As shown in FIG. 5, the parameter DB includes parameters such as the aperture value, the shutter speed, ISO, and the exposure value. In the A mode, the shutter speed is set to be fixed at automatic. Therefore, in the A mode, "no" is associated with the parameter of the shutter speed as the "operation yes/no".

For example, a "front dial" is associated with the "aperture value" as the corresponding operation unit. Moreover, a "front surface", a "right surface", and a "rear surface" are associated with the "aperture value" as the corresponding button layout drawings. That is, this shows that the parameter of the "aperture value" can be changed by the front dial 33c and that the front dial 33c is displayed on the button layout drawings of the "front surface", the "right surface", and the "rear surface".

Figure 6:
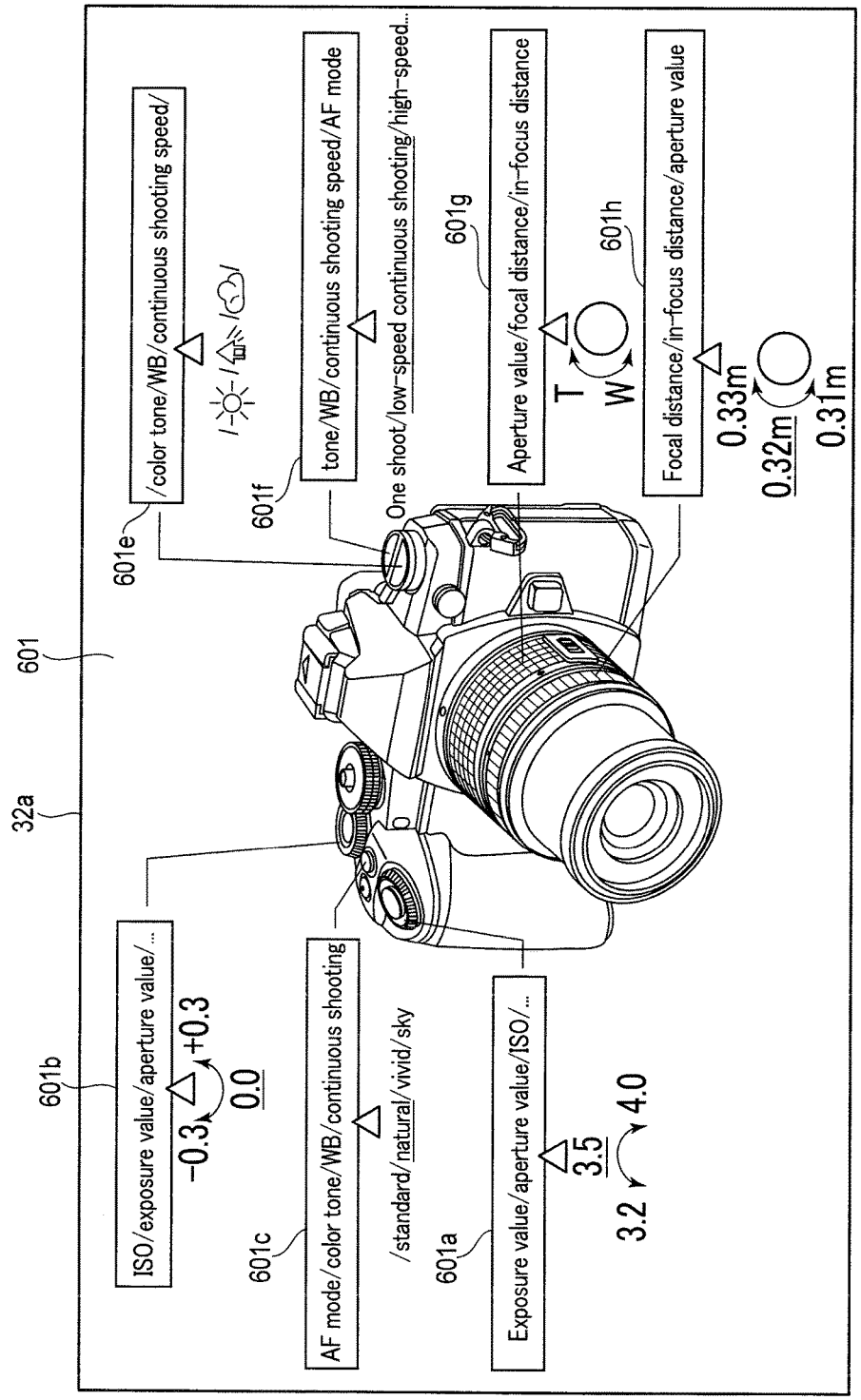
FIG. 6 is a diagram illustrating a display example of the imaging apparatus according to one embodiment.
Figure 7:
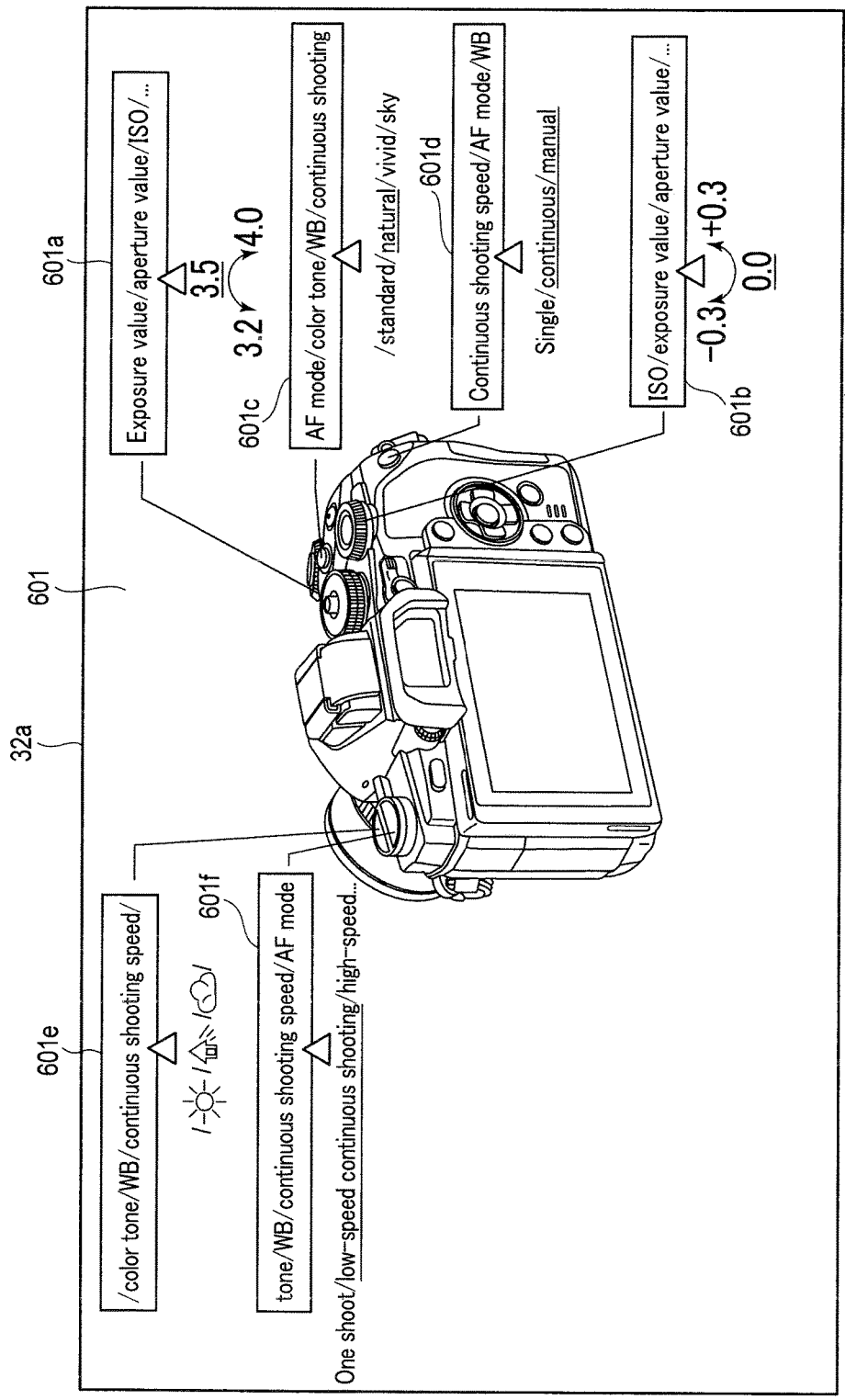
FIG. 7 is a diagram illustrating a display example of the imaging apparatus according to one embodiment.

The imaging apparatus 100 reads the aforementioned button layout drawing from the first storage area 57a, reads the parameter DB from the second storage area 57b, and generates a help screen shown in FIG. 6 and FIG. 7 on the basis of the read button layout drawing and parameter DB. The help screen is a screen which shows the allocation parameters allocated to the various operation units.

The microcomputer 50 displays the allocation parameter corresponding to each of the operation units on the button layout drawing (operation unit layout drawing) indicating the position of each of the units of the operation unit 33, on the basis of the parameter DB showing the operation unit allocated to each allocation parameter, thereby generating the help screen. In this case, the microcomputer 50 functions as a screen generating unit.

FIG. 6 and FIG. 7 are diagrams showing an example of a help screen 601. FIG. 6 shows an example of the help screen 601 on the front side of the imaging apparatus 100. FIG. 7 shows an example of the help screen 601 on the rear side of the imaging apparatus 100.

When the eyepiece sensor 32c detects that the photographer is looking through the finder unit, the imaging apparatus 100 displays the help screen 601 on the EVF 32b. When the eyepiece sensor 32c detects that the photographer is not looking through the finder unit, the imaging apparatus 100 displays the help screen 601 on the liquid crystal monitor 32a.

Figure 8:
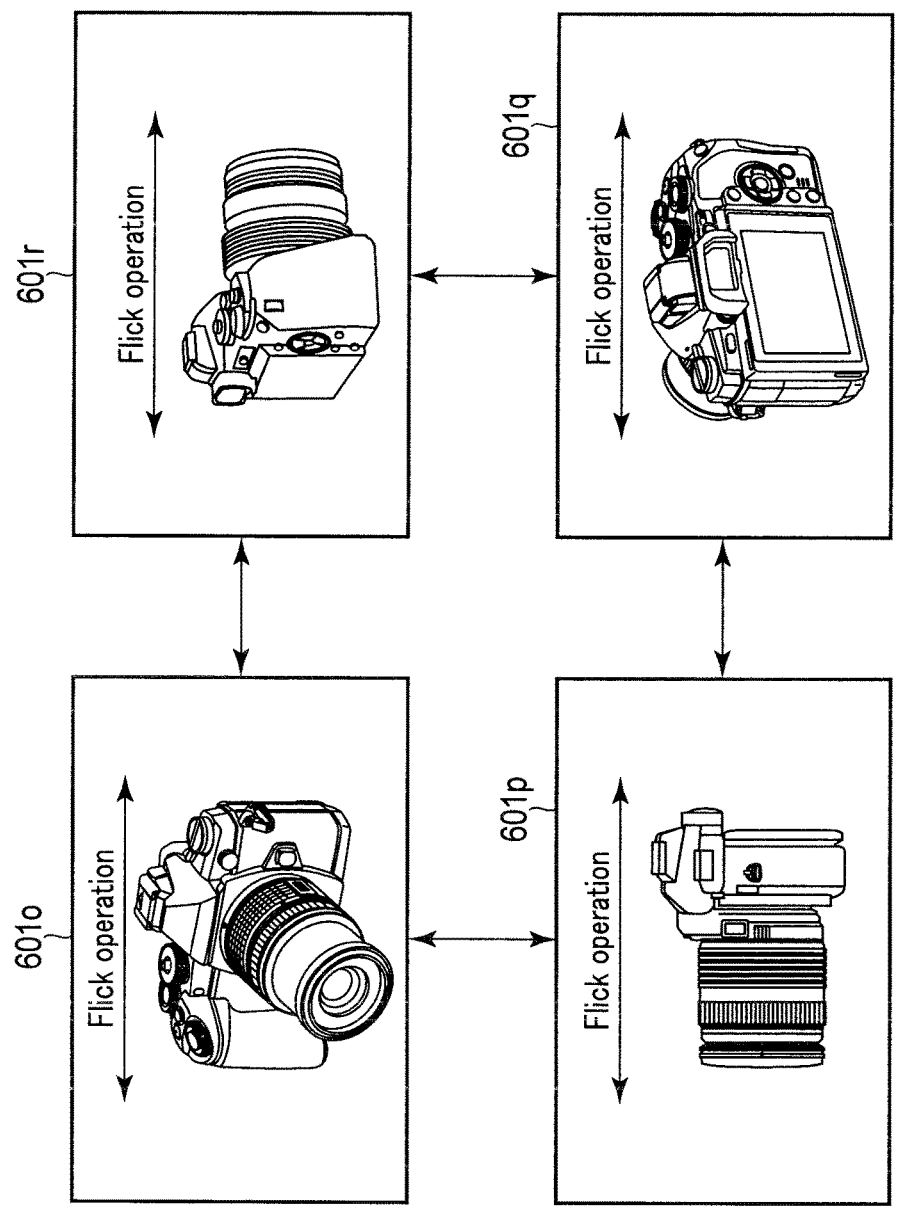
FIG. 8 is a diagram illustrating a display example of the imaging apparatus according to one embodiment.

In response to an operational input, the imaging apparatus 100 can rotate the button layout drawing on the help screen 601 displayed by the display unit 32 as shown in FIG. 8.

FIG. 8 shows a help screen 601o in which the button layout drawing shows the front side, a help screen 601p in which the button layout drawing shows the left side, a help screen 601q in which the button layout drawing shows the rear side, and a help screen 601r in which the button layout drawing shows the right side. For example, when a right-left flick operation (rotational operation) is input by the touch sensor 33s while screens 601o, 601p, 601q, or 601r are being displayed on the liquid crystal monitor 32a, the microcomputer 50 switches the displays of the help screen 601o to the help screen 601r. For example, when a leftward flick operation is input, the microcomputer 50 switches the screens in the order of the help screen 601o>the help screen 601p>the help screen 601q>the help screen 601r>the help screen 601o. For example, when a rightward flick operation is input, the microcomputer 50 switches the screens in the order of the help screen 601o>the help screen 601r>the help screen 601q>the help screen 601p, >the help screen 601o. As a result, the microcomputer 50 can rotate the button layout drawing on the help screen 601 in response to the right-left flick operation input by the touch sensor 33s. In the present embodiment, an indicator 601c and the like shown in FIG. 6 and FIG. 7 are not displayed during the change of the button layout drawings to enhance visibility so that the pose may be easily known.

For example, a "front dial" is associated with the "aperture value" as the corresponding operation unit. Moreover, a "front surface", a "right surface", and a "rear surface" are associated with the "aperture value" as the corresponding button layout drawings. That is, this shows that the parameter of the "aperture value" can be changed by the front dial 33c and that the front dial 33c is displayed on the button layout drawings of the "front surface", the "right surface", and the "rear surface".

When the help screen 601 is displayed on the EVF 32b, the imaging apparatus 100 can rotate the button layout drawing on the help screen 601 on the basis of the operational input of the cross button 33k, the front dial 33c, or the rear dial 33d.

When the help screen 601 is displayed on the liquid crystal monitor 32a, the imaging apparatus 100 can rotate the button layout drawing on the help screen 601 on the basis of the operational input by the touch sensor 33s formed integrally with the liquid crystal monitor 32a, the cross button 33k, the front dial 33c, or the rear dial 33d.

The imaging apparatus 100 draws the read button layout drawing. Further, the imaging apparatus 100 displays, in the vicinity of each operation unit on the button layout drawing, information indicating the parameter (allocation parameter) allocated to each operation unit and the parameter (allocatable parameter) that are allocatable by each operation unit to generate the help screen 601. That is, the microcomputer 50 displays, in the help screen 601, the allocation parameter in association with the operation unit to which the allocation parameter on the button layout drawing is allocated.

More specifically, the imaging apparatus 100 displays a "parameter name" in the parameter DB at a position indicated by the "operation unit position" in the parameter DB on the drawn button layout drawing. That is, the help screen 601 shown in FIG. 6 and FIG. 7 is a screen in which at the position corresponding to the operation unit on the button layout drawing, the allocation parameter allocated to this operation unit and the allocatable parameter that is allocatable to this operation unit are shown.

Furthermore, for example, the imaging apparatus 100 previously holds a list showing the kinds of parameters that are allocatable to each operation unit in the storage unit 57 for each operational button and each dial. Thus, the imaging apparatus 100 can display, in the help screen, information that indicates the parameter that is allocatable to each operation unit of the imaging apparatus 100. Thus, the imaging apparatus 100 can simultaneously display, in the help screen 601, the allocation parameter that is set to be changed by the each operation unit, and the allocatable parameter that can be set to be changed by the each operation unit.

Further yet, the ROM 200c of the lens 200 previously stores a drawing (lens exterior drawing) indicating the positions of the operation units on the exterior of the lens 200. Moreover, the ROM 200c comprises a list showing the kinds of parameters that are allocatable to the first operation ring 210 and the second operation ring 220 of the lens 200. Moreover, the ROM 200c comprises information indicating the operation unit position of the lens 200, that is, information indicating the positions of the first operation ring 210 and the second operation ring 220 on the lens exterior drawing.

As lens information, the imaging apparatus 100 acquires, from the ROM 200c of the lens 200, the lens exterior drawing, information indicating parameters that are allocatable to the first operation ring 210 and the second operation ring 220, and the operation unit position. Thus, the imaging apparatus 100 can further display, in the help screen 601, information indicating the parameters that are allocatable to each operation unit of the lens 200.

According to the example in FIG. 6, the imaging apparatus 100 displays, in the help screen 601, indicators 601a to 601h for indicating the allocation parameters and the allocatable parameters.

The indicator 601a indicates the parameter allocated to the front dial 33c, and the parameters that are allocatable to the front dial 33c. Moreover, the indicator 601a can also indicate how the parameter is changed in accordance with the rotation direction of the front dial 33c. According to the example in FIG. 6 and FIG. 7, the indicator 601a indicates that the "aperture value" is allocated to the front dial 33c, that, for example, the "exposure value" and the "ISO" can be allocated to the front dial 33c, that the current value of the "aperture value" is "3.5", that the "aperture value" changes from "3.5" to "4.0" when the front dial 33c is rotated in the rightward direction, and that the "aperture value" changes from "3.5" to "3.2" when the front dial 33c is rotated in the leftward direction.

The indicator 601b indicates the parameter allocated to the rear dial 33d, and the parameters that are allocatable to the rear dial 33d. Moreover, the indicator 601b can also indicate how the parameter is changed in accordance with the rotation direction of the rear dial 33d.

The indicator 601c indicates the parameter allocated to the first function button 33f, and the parameters that are allocatable to the first function button 33f. Moreover, the indicator 601c can also indicate how the parameter is changed in accordance with the operation of the first function button 33f. According to the example in FIG. 6 and FIG. 7, the indicator 601c indicates that the "color tone" is allocated to the first function button 33f, that, for example, the "AF mode", the "WB", and the "continuous shooting mode" can be allocated to the first function button 33f, that the current value of the "color tone" is "natural", and that the "color tone" changes to "standard", "natural", and "vivid" whenever the first function button 33f is operated.

The indicator 601d indicates the parameter allocated to the second function button 33g, and the parameters that are allocatable to the second function button 33g. Moreover, the indicator 601d can also indicate how the parameter is changed in accordance with the operation of the second function button 33g.

The indicator 601e indicates the parameter allocated to the third function button 33h, and the parameters that are allocatable to the third function button 33h. Moreover, the indicator 601e can also indicate how the parameter is changed in accordance with the operation of the third function button 33h.

The indicator 601f indicates the parameter allocated to the fourth function button 33i, and the parameters that are allocatable to the fourth function button 33i. Moreover, the indicator 601f can also indicate how the parameter is changed in accordance with the operation of the fourth function button 33i.

The indicator 601g indicates the parameter allocated to the first operation ring 210 of the lens 200, and the parameters that are allocatable to the first operation ring 210. Moreover, the indicator 601g can also indicate how the parameter is changed in accordance with the operation of the first operation ring 210. According to the example in FIG. 6 and FIG. 7, the indicator 601g indicates that the "focal distance" is allocated to the first operation ring 210, that, for example, the "aperture value" and the "in-focus distance" can be allocated to the first operation ring 210, that the "focal distance" changes to a telephotographic side when the first operation ring 210 is rotated in the rightward direction, and that the "focal distance" changes to a wide-angle side when the first operation ring 210 is rotated in the leftward direction.

The indicator 601h indicates the parameter allocated to the second operation ring 220 of the lens 200, and the parameters that are allocatable to the second operation ring 220. Moreover, the indicator 601h can also indicate how the parameter is changed in accordance with the operation of the second operation ring 220. According to the example in FIG. 6 and FIG. 7, the indicator 601h indicates that the "in-focus distance" is allocated to the second operation ring 220, that, for example, the "focal distance" and the "aperture value" can be allocated to the second operation ring 220, that the "in-focus distance" changes from "0.32 m" to "0.33 m" when the second operation ring 220 is rotated in the rightward direction, and that the "in-focus distance" changes from "0.32 m" to "0.31 m" when the second operation ring 220 is rotated in the leftward direction.

The imaging apparatus 100 may be configured to change the allocation parameter on the help screen 601 when the help screen 601 is displayed on the liquid crystal monitor 32a. Moreover, the imaging apparatus 100 may be configured to change the set value of the parameter on the help screen 601 when the help screen 601 is displayed on the liquid crystal monitor 32a.

For example, the imaging apparatus 100 may be configured to change the allocation parameter of the operation unit corresponding to the indicator and the set value of the parameter when a right-left flick operation is input to the indicators 601a to 601h on the help screen 601 by the touch sensor 33s. Moreover, for example, the imaging apparatus 100 may be configured to select one of the indicators 601a to 601h on the help screen 601 on the basis of the operations of the cross button 33k, the front dial 33c, and the rear dial 33d when the help screen 601 is displayed on the display unit 32, and change the allocation parameter of the operation unit corresponding to the selected indicator and the set value of the parameter.

The first function button 33f, the second function button 33g, the third function button 33h, and the fourth function button 33i are configured to cyclically change the allocation parameter whenever depressed. Thus, the imaging apparatus 100 can cyclically change the set value of the allocation parameter in response to the depression of the first function button 33f, the second function button 33g, the third function button 33h, and the fourth function button 33i. Regarding information indicating a certain parameter of the operation unit that has been already set, for example, the color or thickness of characters may be changed and displayed so that it is possible to know that the parameter has been already set.

The imaging apparatus 100 displays the help screen 601 on the liquid crystal monitor 32a or the EVF 32b when a help operation is input. The help operation is, for example, an operational input by the touch sensor 33s of the icon 410 on the through-image 401 shown in FIG. 4, or an operational input by a button in the operation unit 33 to which the help operation has been previously allocated. The imaging apparatus 100 may be configured to display the help screen 601 on the liquid crystal monitor 32a of the display unit 32 when the power supply switch 33r is operated so that the electric power supply state of the imaging apparatus 100 changes from off to on.

Moreover, the imaging apparatus 100 may be configured to comprise an operation unit which functions as a help operation when the eyepiece sensor 32c detects that the photographer is looking through the finder unit. For example, it is expected that the erase button 33o is not frequently used when the photographer is looking through the finder unit. Therefore, the imaging apparatus 100 may be configured to recognize that the help operation has been input when the erase button 33o is depressed in the case where the eyepiece sensor 32c detects that the photographer is looking through the finder unit.

Figure 9:
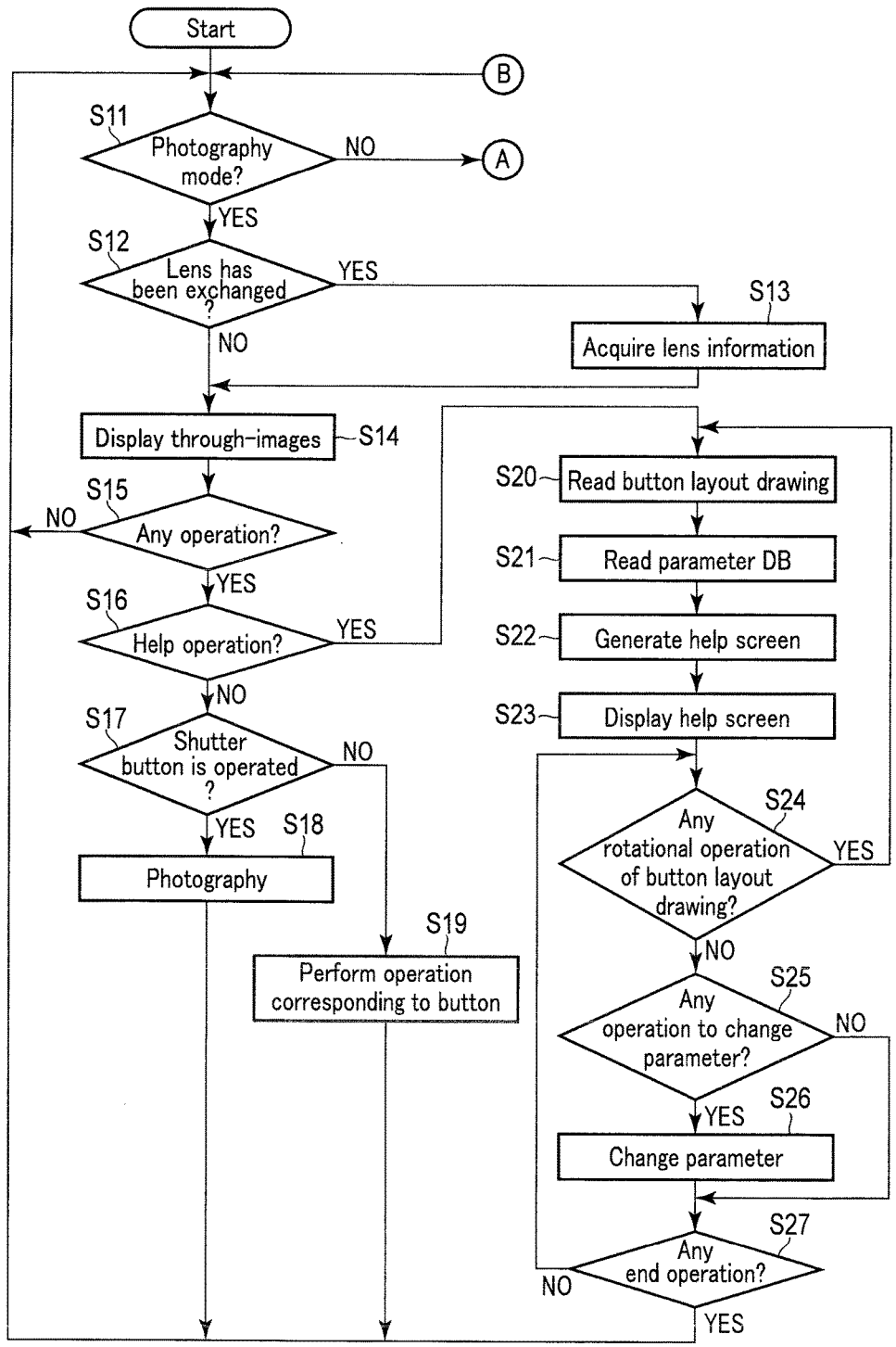
FIG. 9 is a diagram illustrating an example of the operation of the imaging apparatus according to one embodiment.

FIG. 9 and FIG. 10 show an example of the operation of the imaging apparatus 100.

When the electric power supply of the imaging apparatus 100 is turned on, the imaging apparatus 100 performs the operation shown in FIG. 9 and FIG. 10.

The microcomputer 50 of the imaging apparatus 100 judges whether the mode is the photography mode (step S11). When judging that the mode is not the photography mode, the microcomputer 50 shifts to later-described processing in FIG. 10.

When judging in step S11 that the mode is the photography mode, the microcomputer 50 judges whether the lens has been exchanged (step S12). That is, the microcomputer 50 judges whether the lens 200 has been detached from the mount and whether the lens 200 has been again attached.

When judging that the lens has been exchanged, the microcomputer 50 acquires lens information from the lens 200 (step S13).

The microcomputer 50 acquires through-images, and displays, by the display unit 32, the through-images on which an OSD display is superimposed (step S14).

The microcomputer 50 judges whether there is any operational input during the display of the through-images (step S15). When judging that there is no operational input, the microcomputer 50 loops to the processing in step S11.

When judging that there is an operational input, the microcomputer 50 judges whether the operational input is a help operation (step S16).

When judging that the operational input is not a help operation, the microcomputer 50 judges whether the operational input is the operation of the shutter button 33*b* (step S17).

When judging that the operational input is the operation of the shutter button 33*b*, the microcomputer 50 performs photography, and loops to the processing in step S11 (step S18). That is, the microcomputer 50 generates a charge by the image pickup device 17 on the basis of the setting information, and generates image data by the signal processing unit 18 and the A/D 19 in accordance with the generated charge. Further, the microcomputer 50 saves the generated image data in the recording medium M attached to the memory I/F 61, and returns to the processing in step S11.

When judging that the operational input is not the operation of the shutter button 33*b*, the microcomputer 50 performs an operation corresponding to the operated button, and loops to the processing in step S11 (step S19).

When judging in step S16 that the operational input is a help operation, the microcomputer 50 displays the help screen 601 by the display unit 32. To this end, the microcomputer 50 reads the button layout drawing from the first storage area 57*a* of the storage unit 57 (step S20).

Furthermore, the microcomputer 50 reads the parameter DB from the second storage area 57*b* of the storage unit 57 (step S21).

The microcomputer 50 generates the help screen 601 on the basis of the read button layout drawing and parameter DB (step S22).

The microcomputer 50 displays the generated help screen 601 by the display unit 32 (step S23).

The microcomputer 50 judges whether an operation to rotate the button layout drawing has been input on the basis of the operational input being displayed in the help screen 601 (step S24). When judging that the operation to rotate the button layout drawing has been input, the microcomputer 50 loops to the processing in step S20 to perform the processing in step S20 to step S23, and generates the help screen 601 by using the button layout drawing of a different angle corresponding to the operation. Thus, the imaging apparatus 100 can sequentially rotate the button layout drawing on the help screen 601 in response to the operational input.

When judging in step S24 that the operation to rotate the button layout drawing has not been input, the microcomputer 50 judges whether an operation to change the allocation parameter or the set value of the parameter has been input (step S25). When judging that the operation to change the allocation parameter or the set value of the parameter has been input, the microcomputer 50 changes the allocation parameter or the set value of the parameter (step S26).

Furthermore, the microcomputer 50 judges whether an operation to end the help screen 601 has been performed (step S27). When, for example, the shutter button 33*b*, the movie button 33*e*, the menu button 33*j*, the reproduction button 33*n*, the erase button 33*o*, or the info button 33*p* is operated during the display of the help screen 601, the microcomputer 50 judges that the operation to end the help screen 601 has been performed. When judging that the operation to end the help screen 601 has been performed, the microcomputer 50 loops to the processing in step S11. When judging that the operation to end the help screen 601 has not been performed, the microcomputer 50 loops to step S24, and continues the display of the help screen 601.

For example, when the mode dial 33*a* is operated during the display of the help screen 601, the microcomputer 50 loops to step S20, reads the button layout drawing and the parameter DB that corresponds to the changed photography mode from the storage unit 57, and again generates the help screen 601 by using the read button layout drawing and parameter DB. Thus, the imaging apparatus 100 can switch the contents of the help screen 601 in response to the operation of the mode dial 33*a* being displayed in the help screen 601.

The second storage area 57*b* of the storage unit 57 may comprise, for each photography mode, parameters DB that differ between the state "lever 1" and the state "lever 2" of the switch lever 33*q*. Moreover, when the switch lever 33*q* is operated during the display of the help screen 601, the microcomputer 50 loops to the processing in step S20, reads the button layout drawing and the parameter DB that corresponds to the changed state of the switch lever 33*q* from the storage unit 57, and again generates the help screen 601 by using the read button layout drawing and parameter DB. Thus, the imaging apparatus 100 can switch the contents of the help screen 601 in response to the operation of the switch lever 33*q* being displayed in the help screen 601.

For example, the imaging apparatus 100 may be configured to change the allocation parameter of the operation unit corresponding to the indicator and the set value of the parameter when a right-left flick operation is input to the indicators 601*a* to 601*h* on the help screen 601 by the touch sensor 33*s*. Moreover, for example, the imaging apparatus 100 may be configured to select one of the indicators 601*a* to 601*h* on the help screen 601 on the basis of the operations of the cross button 33*k*, the front dial 33*c*, and the rear dial 33*d* when the help screen 601 is displayed on the display unit 32, and change the allocation parameter of the operation unit corresponding to the selected indicator and the set value of the parameter.

That is, the microcomputer 50 can change the angle of the button layout drawing, the display state of the allocation parameter, and the set value of the allocation parameter in response to the operation of the touch sensor 33*s* while the help screen 601 is being displayed on the display unit 32.

When judging in step S11 that the mode is not the photography mode, the microcomputer 50 shifts to step S31 in FIG. 10.

The microcomputer 50 judges whether the imaging apparatus 100 is in a reproduction mode (step S31). When the reproduction button 33*n* is pressed, the imaging apparatus 100 shifts to the reproduction mode to display a reproduction screen for displaying the images or moving images saved in the recording medium M on the liquid crystal monitor 32*a*. When the imaging apparatus 100 is in the reproduction mode, the microcomputer 50 displays, by the display unit 32, a reproduction screen for reproducing images or moving images (step S32).

Furthermore, the microcomputer 50 judges whether an operation to switch the images or moving images which are displayed while the reproduction screen is being displayed by the display unit 32 has been input (step S33). When judging that the operation to switch the images or moving images has been input, the microcomputer 50 switches the images or moving images to be displayed by the display unit 32 (step S34).

The microcomputer 50 judges whether an operation to end the display of the reproduction screen has been performed (step S35). For example, when the shutter button 33*b*, the movie button 33*e*, or the menu button 33*j* is operated while the reproduction screen is being displayed, the microcomputer 50 judges that the operation to end the reproduction screen has been performed. When judging that the operation to end the reproduction screen has been performed, the microcomputer 50 loops to step S11 in FIG. 9. When judging that the operation to end the reproduction screen has not been performed, the microcomputer 50 loops to step S33, and continues the display of the reproduction screen.

When judging in step S31 that the mode is not the reproduction mode, the microcomputer 50 recognizes that a communication with the slate PC 300 is being performed. The microcomputer 50 judges whether the slate PC 300 has sent a state check request to check the setting status of various parameters in the imaging apparatus 100 and the allocation parameter allocated to each operation unit (step S36).

When the microcomputer 50 does not recognize that the state check request has been sent from the slate PC 300, that is, when the microcomputer 50 does not receive the state check request sent from the slate PC 300, the microcomputer 50 sends the images or moving images to the slate PC 300 to display the aforementioned reproduction screen on the slate PC 300 (step S37).

When the slate PC 300 receives the images or moving images from the imaging apparatus 100, the slate PC 300 can reproduce, on its display device, the images or moving images received from the imaging apparatus 100. Moreover, the microcomputer 50 can send any images or moving images to the slate PC 300 at the request of the slate PC 300.

When the microcomputer 50 recognizes in step S36 that the state check request has been sent from the slate PC 300, that is, when the microcomputer 50 receives the state check request sent from the slate PC 300, the microcomputer 50 sends, to the slate PC 300, various information to display the aforementioned help screen and the setting status of various parameters on the slate PC 300 (step S38).

For example, when the microcomputer 50 receives the state check request output from the slate PC 300, the microcomputer 50 reads the button layout drawing from the first storage area 57a of the storage unit 57, reads the parameter DB from the second storage area 57b of the storage unit 57, and sends the read button layout drawing and parameter DB to the slate PC 300.

When the slate PC 300 receives the button layout drawing and the parameter DB from the imaging apparatus 100, the slate PC 300 performs processing similar to that in the imaging apparatus 100 to generate a state check screen which includes display similar to that in the help screen 601, and displays the generated state check screen on its display device.

FIG. 11 shows an example of the configuration of the slate PC 300.

The slate PC 300 comprises a control unit 350, an operational input unit 364, a communication unit 371, and a storage device 374. The slate PC 300 further comprises a camera 310, a speaker 322, a microphone 323, a display 334, and a touch sensor 335.

The camera 310 is a camera provided inside the slate PC 300. The camera 310 comprises an optical system which receives light, and an image pickup device which converts light into an electric signal. The camera 310 converts light received by the optical system into an electric signal by the image pickup device under the control of the control unit 350, and generates image data.

The control unit 350 functions as a control unit which controls the operation of each unit of the slate PC 300. The control unit 350 comprises a CPU 351, a ROM 352, a RAM 353, and a nonvolatile memory 354. The control unit 350 performs various processing on the basis of a control signal supplied from the operational input unit 364 or the touch sensor 335.

The CPU 351 comprises, for example, a computing element which executes various computing processing. The CPU 351 enables various functions by executing programs stored in the ROM 352 or the nonvolatile memory 354.

The ROM 352 stores, for example, programs for controlling the slate PC 300, and programs for enabling various functions. The CPU 351 starts the program stored in the ROM 352 on the basis of a control signal supplied from the operational input unit 364. Thus, the control unit 350 controls the operation of each unit.

The RAM 353 functions as a work memory of the CPU 351. That is, the RAM 353 stores, for example, the computation results by the CPU 351, and data read by the CPU 351.

The nonvolatile memory 354 is a nonvolatile memory which stores various setting information and programs.

The CPU 351 can perform various processing on the basis of data such as applications stored in the storage device 374.

The control unit 350 can generate video signals of, for example, various screens and display the signals on the display 334 in accordance with the application being executed by the CPU 351. The control unit 350 can also generate audio signals of, for example, various sounds and output the sounds by the speaker 322 in accordance with the application being executed by the CPU 351.

The speaker 322 reproduces sound on the basis of the audio signals that are supplied.

The microphone 323 is a sound collecting unit which generates signals (recorded signals) on the basis of sound outside the slate PC 300. The microphone 323 supplies the recorded signals to the control unit 350.

The display 334 comprises a liquid crystal display device provided with a liquid crystal display panel which comprises pixels arrayed in matrix form and a backlight which illuminates the liquid crystal panel. The display 334 displays pictures on the basis of video signals.

The touch sensor 335 is a capacitance type sensor, a thermosensor, or a device which generates positional information on the basis of some other method. For example, the touch sensor 335 is provided integrally with the display 334. Thus, the touch sensor 335 can generate an operational signal on the basis of an operation on a screen displayed on the display 334, and supply the operational signal to the control unit 350.

The operational input unit 364 comprises, for example, keys for generating the operational signal in response to the operational input by the user. For example, the operational input unit 364 comprises a sound volume adjustment key for adjusting sound volume, a luminance adjustment key for adjusting the display luminance of the display 334, and an electric power supply key for switching the electric power supply state of the slate PC 300. The operational input unit 364 may also comprise, for example, a track ball for the slate PC 300 to perform various selection operations. The operational input unit 364 generates an operational signal in response to the operation of the aforementioned keys, and supplies the operational signal to the control unit 350.

The operational input unit 364 may be configured to receive an operational signal from a keyboard, a mouse, or some other input device which can generate the operational signal. For example, when the slate PC 300 comprises a USB terminal or a Bluetooth module, the operational input unit 364 receives an operational signal from an input device connected by the USB or Bluetooth, and supplies the operational signal to the control unit 350.

The communication unit 371 can communicate with other devices on a network such as the Internet or an intranet by the wireless LAN. The communication unit 371 may be configured to directly communicate with other devices by the wireless LAN.

The slate PC 300 also comprises an unshown electric power supply unit. The electric power supply unit comprises a battery, and a terminal (e.g. a DC jack) for connecting to an adapter which receives electric power from a commercial electric power source. The electric power supply unit charges the battery with the electric power received from the commercial electric power source. The electric power supply unit also supplies the electric power which has charged the battery to each unit inside the slate PC 300.

The storage device 374 comprises a hard disk drive (HDD), a solid state drive (SSD), or a semiconductor memory. The storage device 374 can store the program which is executed by the CPU 351 of the control unit 350, applications, and various data.

The storage device 374 stores, for example, an operating system (OS), and various applications that can be executed on the OS. The storage device 374 has, for example, an application (control application) to control the device (e.g. the imaging apparatus 100) which can communicate with the slate PC 300. The control unit 350 of the slate PC 300 can perform the following processing by executing the control application: photography by the imaging apparatus 100, reproduction of the images or moving images saved in the recording medium M inside the imaging apparatus 100, and generation of the state check screen for checking various parameters set in the imaging apparatus 100.

Figure 12:
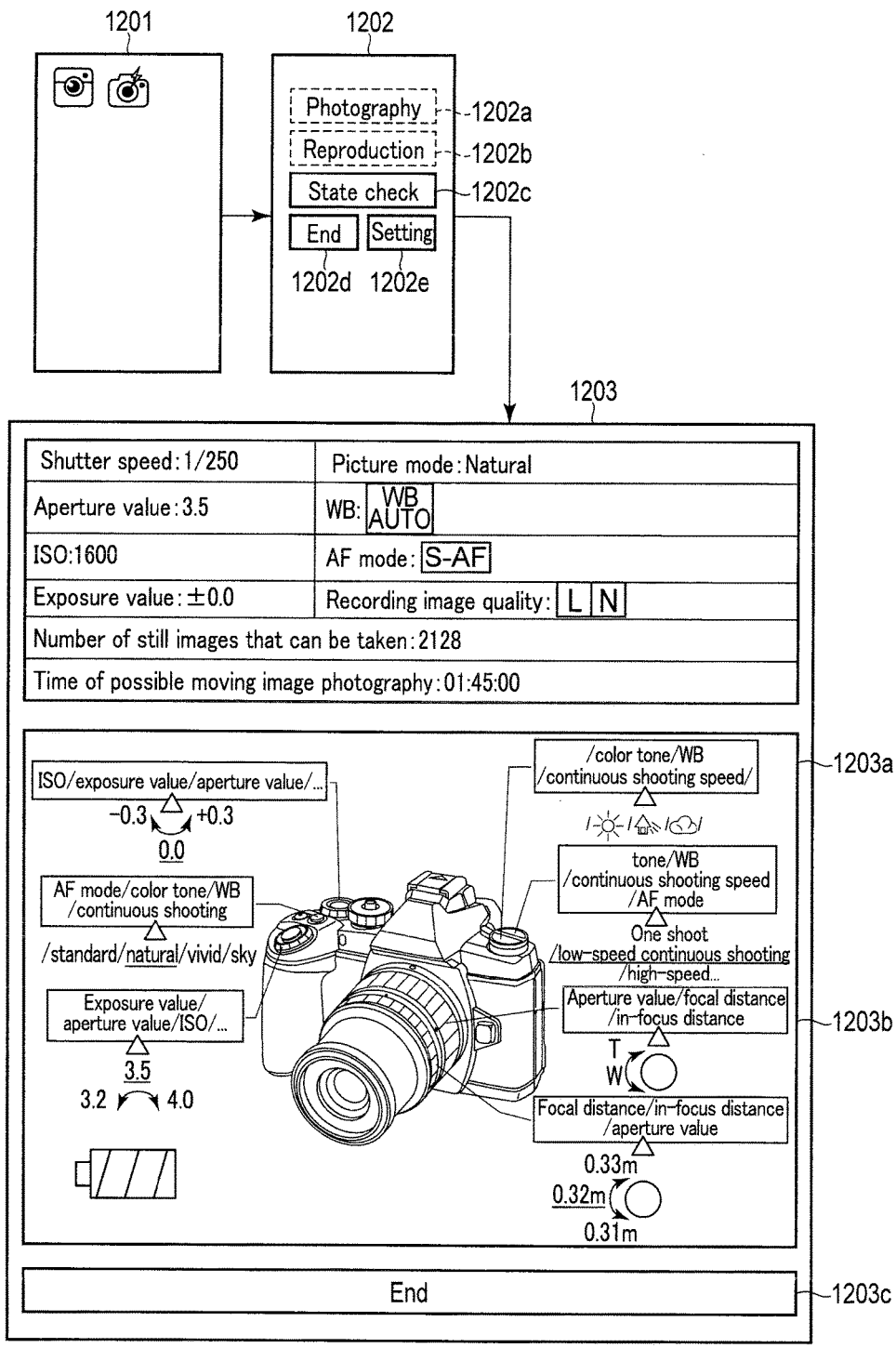
FIG. 12 is a diagram illustrating an example of the operation and display of the portable terminal according to one embodiment.
Figure 13:
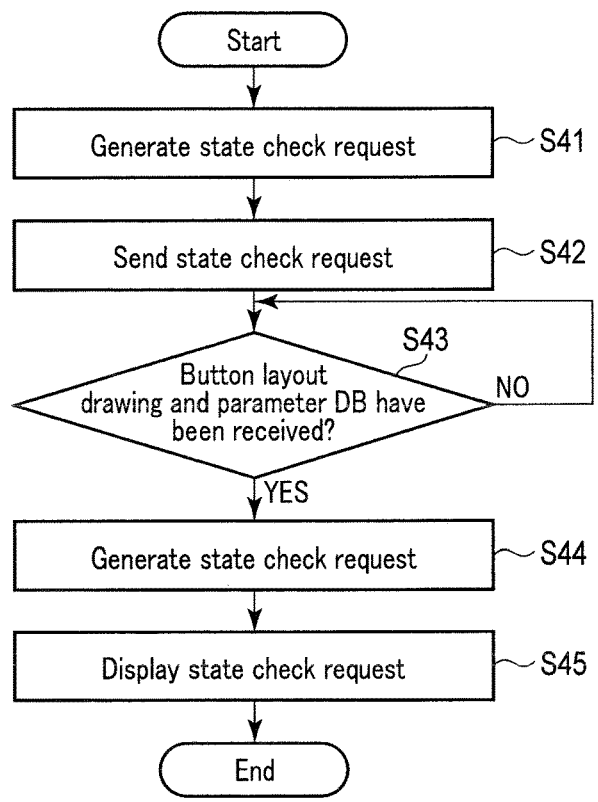
FIG. 13 is a diagram illustrating an example of the operation of the portable terminal according to one embodiment.
Figure 14:
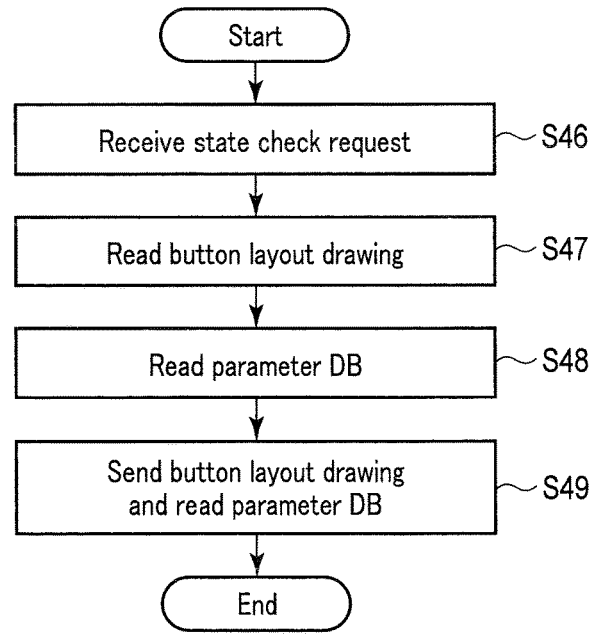
FIG. 14 is a diagram illustrating an example of the operation of the imaging apparatus according to one embodiment.

FIG. 12 to FIG. 14 show an example of the operation of the slate PC 300. FIG. 12 shows an example of a screen displayed on the slate PC 300 when the slate PC generates the state check screen. FIG. 13 is a flowchart showing the example of the operation of the slate PC 300 in which the slate PC 300 generates the state check screen. FIG. 14 is a flowchart showing the example of the operation of the imaging apparatus 100 in which the slate PC 300 generates the state check screen.

The control unit 350 of the slate PC 300 displays an icon for starting various applications in a home screen 1201 which is displayed on the display 334. When the aforementioned control application for controlling the imaging apparatus 100 is selected in the home screen, the control unit 350 displays, on the display 334, a menu screen 1202 of the control application for external camera control. The control unit 350 displays buttons such as a photography button 1202a, a reproduction button 1202b, a state check button 1202c, an end button 1202d, and a setting button 1202e in the menu screen 1202 so that these buttons are selectable by the touch sensor 335.

The photography button 1202a is a button for displaying, on the display, a screen for the imaging apparatus 100 to perform photography. The reproduction button 1202b is a button for reproducing, by the slate PC 300, the images or moving images saved in the recording medium M inside the imaging apparatus 100. The state check button 1202c is a button for displaying, on the display 334, the state check screen for the user to check the setting state of various parameters of the imaging apparatus 100, and the parameter allocated to each operation unit as in the help screen 601. The end button 1202d is a button for ending the control application. The setting button 1202e is a button for executing various settings of the control application.

When the state check button 1202c is selected in the menu screen 1202, the control unit 350 of the slate PC 300 performs the operation shown in FIG. 13.

The control unit 350 generates a state check request (step S41). The state check request is information for requesting the imaging apparatus 100 for information for generating the state check screen. The control unit 350 sends the generated state check request to the imaging apparatus 100 (step S42).

The control unit 350 judges whether the parameter DB and the button layout drawing have been received (step S43). When judging that the parameter DB and the button layout drawing have not been received (step S43, no), the control unit 350 again performs the processing in step S43. That is, after sending the state check request, the control unit 350 waits until receiving the parameter DB and the button layout drawing sent from the imaging apparatus 100.

When judging that the parameter DB and the button layout drawing have been received (step S43, yes), the control unit 350 generates a state check screen 1203 shown in FIG. 12 on the basis of the parameter DB and the button layout drawing that have been received (step S44). The control unit 350 displays the generated state check screen 1203 on the display 334 (step S45).

When the state check request has been sent from the slate PC 300, the microcomputer 50 of the imaging apparatus 100 performs the operation shown in FIG. 14. The microcomputer 50 receives the state check request sent from the slate PC 300 (step S46).

When the microcomputer 50 receives the state check request sent from the slate PC 300, the microcomputer 50 reads the button layout drawing from the first storage area 57a of the storage unit 57 (step S47), and reads the parameter DB from the second storage area 57b of the storage unit 57 (step S48).

The microcomputer 50 sends the parameter DB and the button layout drawing to the slate PC 300 (step S49).

The state check screen 1203 includes an indicator 1203a for the user to check various parameters set in the imaging apparatus 100, a help screen 1203b which shows the allocation parameter allocated to each operation unit of the imaging apparatus 100 and the allocatable parameter that is allocatable to each operation unit, and an end button 1203c for ending the display of the state check screen 1203.

For example, the control unit 350 of the slate PC 300 may be configured to change the parameter of the imaging apparatus 100 on the basis of a touch operation on the indicator corresponding to each operation unit on the help screen 1203b as in the help screen 601. In this case, the control unit 350 generates a control signal for changing the parameter of the imaging apparatus 100 on the basis of the touch operation, and sends the generated control signal to the imaging apparatus 100. As a result, the slate PC 300 can let the user check various parameters of the imaging apparatus 100 and change the various parameters on the basis of the operation on the slate PC.

According to the configuration described above, the imaging apparatus 100 can display the allocation parameter allocated to each operation unit and the allocatable parameter that is allocatable by each operation unit so that these parameters are associated with the button layout drawing. Consequently, the imaging apparatus 100 comprising multiple operation units to which functions for changing various parameters can be freely allocated permits the user to recognize, on one screen, which parameter is allocated to which operation unit. For example, in each of the cases where there is a function that is not frequently used, where the allocation of the favorite function has been changed, and where the functions allocated to the operation units have been changed, the imaging apparatus 100 permits the user to recognize the functions allocated to the operation units on one screen. Thus, even if the user does not fully recognize the functions allocated to the operation units, the user can easily check the functions allocated to the operation units. As a result, it is easier for the user to instantaneously operate the imaging apparatus as intended, and deterioration of convenience can be prevented.

Furthermore, the slate PC 300 can display the allocation parameter allocated to each operation unit of the imaging apparatus 100 and the allocatable parameter that is allocatable by each operation unit so that these parameters are associated with the button layout drawing. Consequently, the slate PC 300 permits the user to recognize, on one screen, which parameter is allocated to which operation unit of the imaging apparatus 100.

As a result, it is possible to provide an imaging apparatus, a control method of the imaging apparatus, and an imaging system which do not deteriorate convenience even if the functions for the operation units are changed.

In the examples of the operations of the imaging apparatus 100 and the slate PC 300 shown in FIG. 13 and FIG. 14, the imaging apparatus 100 sends the parameter DB and the button layout drawing to the slate PC 300, and the slate PC 300 generates the help screen on the basis of the parameter DB and the button layout drawing. However, the imaging apparatus 100 may be configured to generate the help screen on the basis of the parameter DB and the button layout drawing when receiving the state check request from the slate PC 300, and send the generated help screen to the slate PC 300. In this case, the slate PC 300 sends the state check request to the imaging apparatus 100, receives the help screen as the response, and displays the received help screen on the display 334.

Although the imaging apparatus 100 is configured to display the allocation parameters and allocatable parameters of the front dial 33c, the rear dial 33d, the first function button 33f, the second function button 33g, the third function button 33h, and the fourth function button 33i in the help screen 601 in the examples described above, the imaging apparatus 100 is not limited to this configuration. The allocation parameters and allocatable parameters to be displayed in the help screen 601 may correspond to any operation units. Moreover, for example, the allocation parameters and allocatable parameters to be displayed in the help screen 601 may be further narrowed down by the photography mode.

The imaging apparatus 100 may further comprise a motor for switching the mode dial 33a. In this case, the imaging apparatus 100 can change the photography mode on the basis of the operation on the help screen 601. That is, the imaging apparatus 100 can drive the aforementioned motor to rotate the mode dial 33a and change the photography mode when an operation to change the photography mode on the help screen 601 is input.

Second Embodiment

FIG. 15 to FIG. 17 show an example of a lens-type imaging apparatus 500 which operates in cooperation with the slate PC 300. FIG. 15 shows an example of a control system of the imaging apparatus 500. FIG. 16 and FIG. 17 show an example of the exterior of the imaging apparatus 500.

The lens-type imaging apparatus 500 can receive various control signals from the slate PC 300, for example, a tablet PC, a smartphone, or a PC in which an input device such as a keyboard is combined with a slate-shaped display device, perform imaging processing on the basis of the received control signals, and save images or moving images in the recording medium M. Further, the lens-type imaging apparatus 500 can send the images or moving images saved in the recording medium M to the slate PC and then display the images or moving images. Moreover, the lens-type imaging apparatus 500 can acquire through-images, send the through-images to the slate PC 300, and display the through-images.

The lens-type imaging apparatus 500 acquires a subject figure which has passed through the lens as an image by the image pickup device. The lens-type imaging apparatus 500 can save the image in the recording medium when the shutter button is fully pressed.

The lens-type imaging apparatus 500 comprises a lens 510, an image pickup device 520, a signal processing unit 530, an image processing unit 540, a microcomputer 550, a storage unit 555, a sound collecting unit 560, an operation unit 570, a memory interface (I/F) 580, and a communication unit 590.

The signal processing unit 530, the image processing unit 540, the microcomputer 550, the sound collecting unit 560, the operation unit 570, the memory interface (I/F) 580, and the communication unit 590 are connected to one another via the data bus 80.

The lens-type imaging apparatus 500 may be configured to comprise a mount to which the interchangeable lens can be attached instead of the lens 510. In this case, a contact terminal is provided on the mount. This contact terminal permits the lens-type imaging apparatus 500 to communicate with the interchangeable lens attached to the mount. As a result, the lens-type imaging apparatus 500 can acquire various lens information regarding the interchangeable lens such as a focal distance, an aperture value, a lens exterior drawing of the interchangeable lens, and the parameter DB from the interchangeable lens.

The lens 510 receives light, and forms the received light into an image on the image pickup device 520. The lens 510 comprises an optical system which is a combination of lenses, a CPU, and a ROM.

The image pickup device 520 is similar in configuration to the image pickup device 17, and photoelectrically converts the light that has passed through the lens 510.

The signal processing unit 530 is similar in configuration to the signal processing unit 18 and the A/D 19. The signal processing unit 530 subjects a signal output from the image pickup device 520 to signal processing, and quantizes the signal to acquire image data.

The image processing unit 540 subjects the image data to various image processing such as color correction, gamma (γ) correction, contrast correction, monochrome/color mode processing, and live-view image processing under the control of the microcomputer 550. Further, the image processing unit 540 uses the image data to acquire subject luminance information for use in, for example, exposure control. The lens-type imaging apparatus 500 controls ISO, an aperture value, and a shutter speed corresponding to an exposure value on the basis of the subject luminance information.

The image processing unit 540 compresses the image data in a jpeg format, and generates image data (jpeg data) in the jpeg format. The image processing unit 540 outputs the jpeg data to the recording medium M attached to the memory I/F 580 under the control of the microcomputer 550. Thus, the lens-type imaging apparatus 500 can save the jpeg data on the obtained image in the recording medium M.

The microcomputer 550 is a control unit which controls various operations of the lens-type imaging apparatus 500. The microcomputer 550 comprises, for example, a CPU and a cache memory. The storage unit 555 stores, for example, programs for controlling the lens-type imaging apparatus 500, programs for enabling various functions, and various setting information. The CPU is a computing element which executes various computing processing. The cache memory transitorily stores data read by the CPU as a result of the computation by the CPU. In accordance with an operation signal supplied from the operation unit 570, the lens-type imaging apparatus 500 executes the programs stored in the storage unit 555, and controls the operation of each unit of the lens-type imaging apparatus 500.

The sound collecting unit 560 comprises a stereo microphone for acquiring sound during the photography for moving images. The sound collecting unit 560 can acquire stereo sound by the stereo microphone. The sound collecting unit 560 can also acquire monaural sound by the stereo microphone.

The operation unit 570 includes operational buttons and operation rings for receiving operations by the user of the lens-type imaging apparatus 500. As shown in FIG. 16 and FIG. 17, the operation unit 570 comprises a shutter button 570a, a first operation ring 570b, and a second operation ring 570c. Parameters for imaging such as an in-focus distance, a focal distance, and an aperture value can be allocated to the first operation ring 570b and the second operation ring 570c, respectively. The operation unit 570 may comprise a power supply switch for switching on and off the electric power supply of the lens-type imaging apparatus 500.

The shutter button 570a is a button for the lens-type imaging apparatus 500 to perform a release operation and an autofocus (AF) operation. For example, when the shutter button 570a is pressed halfway, the lens-type imaging apparatus 500 performs the autofocus operation. That is, the lens-type imaging apparatus 500 outputs a control signal to the lens 510 so that the lens 510 is focused on a target in an AF area.

For example, when the shutter button 570a is fully pressed, the lens-type imaging apparatus 500 performs photography. That is, the lens-type imaging apparatus 500 generates a charge by the image pickup device 520 on the basis of the setting information, generates image data by the signal processing unit 530 in accordance with the generated charge, subjects the image data to image processing to convert the image data into jpeg data by the image processing unit 540, and saves the jpeg data in the recording medium M attached to the memory I/F 580. The lens-type imaging apparatus 500 may also be configured to save, for example, both the jpeg data and the image data converted by the signal processing unit 530 in the recording medium M attached to the memory I/F 580.

The optical system of the lens 510 includes, for example, a lens for focusing, a lens for zooming, and a diaphragm blade. The lens 510 drives a lens for in-focus of the optical system under the control of the microcomputer 550. When the in-focus distance is allocated to the first operation ring 570b or the second operation ring 570c, the lens 510 can drive the lens for focusing in response to the operation of the first operation ring 570b or the second operation ring 570c to change the in-focus distance.

When the focal distance is allocated to the first operation ring 570b or the second operation ring 570c, the lens 510 can drive the lens for zooming in response to the operation of the first operation ring 570b or the second operation ring 570c to change the focal distance.

When the aperture value is allocated to the first operation ring 570b or the second operation ring 570c, the lens 510 can drive the diaphragm blade in response to the operation of the first operation ring 570b or the second operation ring 570c to change the aperture value.

The lens 510 may be configured to change zooming, focusing, and the aperture value on the basis of a control signal received from the slate PC 300 via the communication unit 590.

The memory I/F 580 controls the input and output of data between the recording medium M and each unit of the lens-type imaging apparatus 500. The memory I/F 580 comprises, for example, a card slot into which the recording medium M can be inserted. The recording medium M comprises contact terminals. The memory I/F 580 also comprises contact terminals which are electrically connected to the contact terminals of the recording medium M when the recording medium M is inserted in the card slot. Thus, the lens-type imaging apparatus 500 can save data in the recording medium M and read data from the recording medium M.

The communication unit 590 is a module which performs various data communications with the slate PC 300. The communication unit 590 can communicate with the slate PC 300 by a wireless LAN or Bluetooth. The communication unit 590 may be configured to communicate with the slate unit 300 via a network such as an intranet by the wireless LAN when the slate PC 300 is connected to the network. The lens-type imaging apparatus 500 can communicate with the slate PC 300 or various other devices by the communication unit 590.

The storage unit 555 comprises a first storage area 555a and a second storage area 555b. The first storage area 555a previously stores drawings (lens layout drawings) showing the positions of various buttons and operation rings on the exterior of the lens-type imaging apparatus 500. The first storage area 555a previously stores more than one button layout drawing in which the lens-type imaging apparatus 500 is viewed from more than one angle. The second storage area 555b stores a parameter database (parameter DB) in which information indicating whether there has been an operation (operation yes/no), an operation unit that corresponds (corresponding operation unit), and a position on the lens exterior drawing (operation unit position) is associated with each of the various parameters.

It is expected that the lens-type imaging apparatus 500 described above is attached to, for example, the slate PC 300 in use. As shown in FIG. 16 and FIG. 17, the lens-type imaging apparatus 500 is attached to the slate PC 300 via a fixture 301. The fixture 301 is hook-shaped, and a protruding lens attachment portion 303 is provided in an attachment flat plate 302. The lens-type imaging apparatus 500 is attached by engagement with the lens attachment portion 303.

When in communication with the slate PC 300, the lens-type imaging apparatus 500 can sequentially send the acquired through-images to the slate PC 300, and display the through-images on the display 334 of the slate PC 300.

At the request of the slate PC 300, the lens-type imaging apparatus 500 sends the lens exterior drawing and the parameter DB to the slate PC 300. Thus, the lens-type imaging apparatus 500 causes the slate PC 300 to generate a help screen for the user to recognize the allocation parameter allocated to each unit of the operation unit 570 of the lens-type imaging apparatus 500, and can display the help screen on the display 334 of the slate PC 300.

Figure 18:
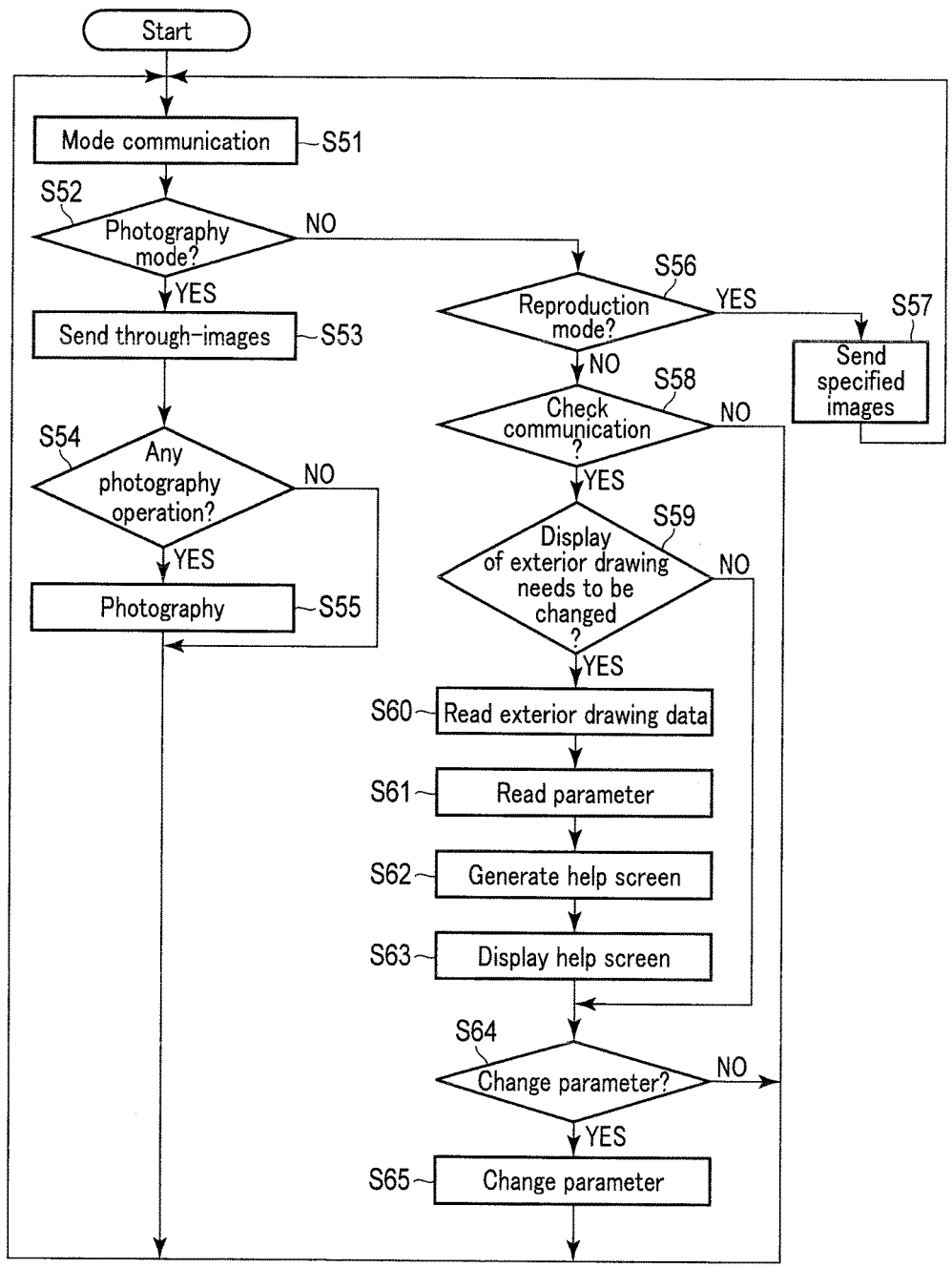
FIG. 18 is a diagram illustrating an example of the operation of the lens-type imaging apparatus according to one embodiment.
Figure 19:
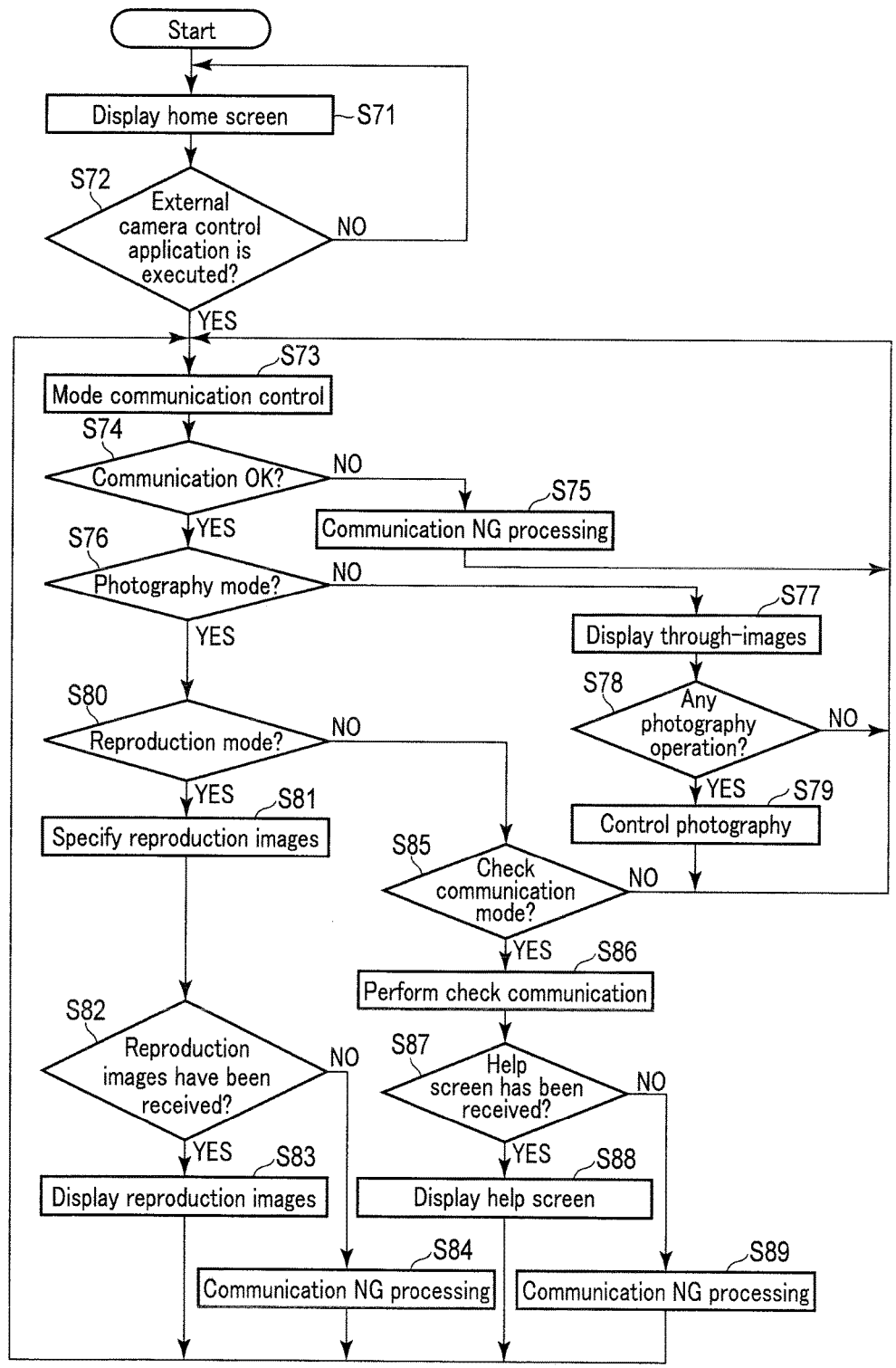
FIG. 19 is a diagram illustrating an example of the operation of the portable terminal which controls the lens-type imaging apparatus according to one embodiment.

FIG. 18 and FIG. 19 are flowcharts showing an example of the operations of the lens-type imaging apparatus 500 and the slate PC 300 which controls the lens-type imaging apparatus 500. FIG. 18 shows an example of the operation of the lens-type imaging apparatus 500. FIG. 19 shows an example of the operation of the slate PC 300 which controls the lens-type imaging apparatus 500.

When the electric power supply is on, the lens-type imaging apparatus 500 waits for a data communication with the slate PC 300 to be established. The data communication is established by performing a particular protocol between the slate PC 300 and the lens-type imaging apparatus 500.

The microcomputer 550 of the lens-type imaging apparatus 500 performs a mode communication (step S51). The microcomputer 550 has modes such as a photography mode, a reproduction mode, and a check communication mode. The microcomputer 550 recognizes which mode is indicated under the control of the slate PC 300, and switches to the recognized mode and then operates.

The microcomputer 550 judges whether the photography mode is indicated by the slate PC 300 (step S52). When judging that the photography mode is indicated, the microcomputer 550 drives the lens 510 so that the received light is formed into an image on the image pickup device 520. The microcomputer 550 acquires through-images from the light that has been formed into the image on the basis of the image pickup device 520, the signal processing unit 530, and the image processing unit 540. The microcomputer 550 sequentially sends the acquired through-images to the slate PC 300 (step S53).

Furthermore, the microcomputer 550 judges whether there is any photography operation (step S54). The microcomputer 550 judges that there has been a photography operation when the shutter button 570a is operated or when the microcomputer 550 has received a control signal indicating photography from the slate PC 300.

When judging that there has been a photography operation, the microcomputer 550 performs photography, and loops to the processing in step S51 (step S55). That is, the microcomputer 550 generates a charge by the image pickup device 520 on the basis of the setting information, and generates image data by the signal processing unit 530 and the image processing unit 540 in accordance with the generated charge. Further, the microcomputer 550 saves the generated image data in the recording medium M attached to the memory I/F 580, and returns to the processing in step S51.

The microcomputer 550 also judges whether the reproduction mode is indicated by the slate PC 300 (step S56). When judging that the reproduction mode is indicated, the microcomputer 550 sends the images or moving images specified by the slate PC 300 to the slate PC 300 (step S57).

The microcomputer 550 further judges whether the check communication mode is indicated by the slate PC 300 (step S58). When judging that the check communication mode is indicated, the microcomputer 550 judges whether the display on the slate PC 300 needs to be changed on the basis of the control signal received from the slate PC 300 (step S59). For example, when an operation that requires the change of the lens exterior drawing, the change of the parameters, or the change of some other display on the slate PC 300 is performed, the microcomputer 550 judges that the display needs to be changed. The microcomputer 550 also judges that the display needs to be changed on the slate PC 300 when the parameters for imaging has been changed by the operation of the operation unit 570. For example, the microcomputer 550 also judges that the display needs to be changed when an operation to open the help screen is first input on the slate PC 300.

When judging that the display needs to be changed on the slate PC 300, the microcomputer 550 generates a help screen, and sends the help screen to the slate PC 300. To this end, the microcomputer 550 reads the lens exterior drawing to the first storage area 555a of the storage unit 555 (step S60).

Furthermore, the microcomputer 550 reads the parameter DB from the second storage area 555b of the storage unit 555 (step S61).

The microcomputer 550 generates a help screen on the basis of the read lens exterior drawing and parameter DB (step S62). For example, the microcomputer 550 generates a help screen which displays the allocation parameter allocated to the position corresponding to each unit of the operation unit 570 on the lens exterior drawing and the allocatable parameter as in the help screen 601.

The microcomputer 550 sends the generated help screen to the slate PC 300 via the communication unit 590 (step S63). Thus, the slate PC 300 can display the help screen on the display 334 such that the user can recognize, at a time, the allocation parameter of each unit of the lens-type imaging apparatus 500 and the allocatable parameter.

The microcomputer 550 judges whether an operation to change the allocation parameter or the set value of the parameter has been input (step S64). When judging that the operation to change the allocation parameter or the set value of the parameter has been input, the microcomputer 50 changes the allocation parameter or the set value of the parameter, and loops to step S51 (step S65).

FIG. 19 shows an example of the operation of the slate PC 300 which operates in response to the operation of the lens-type imaging apparatus 500 shown in FIG. 18.

The control unit 350 of the slate PC 300 displays, on the display 334, a home screen which shows an icon for starting an application (control application adaptive to the lens-type imaging apparatus 500) to control the lens-type imaging apparatus 500 (step S71).

When the control application to control the lens-type imaging apparatus 500 has been selected in the home screen (step S72), the control unit 350 displays a menu screen for the control application on the display 334. In response to the operation on the menu screen, the control unit 350 selects one of the photography mode, the reproduction mode, and the check communication mode for checking the state of the lens-type imaging apparatus 500. Further, the control unit 350 performs mode communication control for the lens-type imaging apparatus 500 to recognize the mode selected via the communication unit 371 (step S73).

The control unit 350 judges whether a communication with the lens-type imaging apparatus 500 has been normally performed (step S74). When judging that the communication with the lens-type imaging apparatus 500 is not normally performed, the control unit 350 performs communication NG processing (step S75). In this case, the control unit 350 displays, on the display 334, an alert indicating that, for example, an error has occurred in the communication with the lens-type imaging apparatus 500, and loops to step S73.

When judging in step S74 that the communication with the lens-type imaging apparatus 500 has been normally performed, the control unit 350 judges whether the photography mode has been indicated to the lens-type imaging apparatus 500 (step S76). When judging that the photography mode has been indicated to the lens-type imaging apparatus 500, the control unit 350 acquires through-images from the lens-type imaging apparatus 500, and displays the received through-images on the display 334 (step S77).

Furthermore, the control unit 350 judges whether a photography operation has been input (step S79). For example, when the lens-type imaging apparatus 500 is in the photography mode, the control unit 350 displays, on the display 334, a photography button for the lens-type imaging apparatus 500 to perform photography. When this photography button is operated, the control unit 350 judges that the photography operation has been input. When the shutter button 570a of the lens-type imaging apparatus 500 has been operated, the control unit 350 judges that the photography operation has been input.

When judging that the photography operation has been input, the control unit 350 generates a control signal to instruct the lens-type imaging apparatus 500 to perform photography, sends the generated control signal to the lens-type imaging apparatus 500, and loops to the processing in step S73 (step S79).

When judging in step S76 that the photography mode has not been indicated to the lens-type imaging apparatus 500, the control unit 350 judges whether the reproduction mode has been indicated to the lens-type imaging apparatus 500 (step S80).

When judging that the reproduction mode has been indicated to the lens-type imaging apparatus 500, the control unit 350 specifies reproduction images or reproduction moving images (step S81). For example, the control unit 350 acquires a list (e.g. thumbnails) of the images and moving images saved in the recording medium M attached to the lens-type imaging apparatus 500. The control unit 350 specifies reproduction images or reproduction moving images from the acquired list.

The lens-type imaging apparatus 500 sends, to the slate PC 300, the images or moving images indicated by the slate PC 300 in step S57 in FIG. 18 as described above. The control unit 350 judges whether the reproduction images or reproduction moving images have been received (step S82). When judging that the reproduction images or reproduction moving images have been received, the control unit 350 displays the received reproduction images or reproduction moving images on the display 334, and loops to the processing in step S73 (step S83).

When judging in step S82 that the reproduction images or reproduction moving images have not been received, the control unit 350 performs communication NG processing (step S84). In this case, the control unit 350 displays, on the display 334, an alert indicating that, for example, an error has occurred in the communication with the lens-type imaging apparatus 500, and loops to step S73.

When judging in step S80 that the reproduction mode has not been indicated to the lens-type imaging apparatus 500, the control unit 350 judges whether the check communication mode has been indicated to the lens-type imaging apparatus 500 (step S85).

When judging that the check communication mode has been indicated to the lens-type imaging apparatus 500, the control unit 350 performs a check communication (step S86). In this case, the control unit 350 sends a control signal regarding the check communication to the lens-type imaging apparatus 500. For example, when the help screen for checking the parameter allocated to each operation unit of the lens-type imaging apparatus 500 is first opened, the control unit 350 requests the lens-type imaging apparatus 500 for the help screen. When the help screen is already open on the display 334, the control unit 350 judges whether the display on the help screen needs to be changed. When judging that the display on the help screen needs to be changed, the control unit 350 requests the lens-type imaging apparatus 500 for a new help screen.

The lens-type imaging apparatus 500 generates the help screen requested by the slate PC 300 in steps S60 to 63 in FIG. 18 as described above, and sends the generated help screen to the slate PC 300. The control unit 350 judges whether an image of the help screen has been received (step S87). When judging that the image of the help screen has been received, the control unit 350 displays the help screen on the display 334 on the basis of the received image, and loops to the processing in step S73 (step S88).

When judging in step S87 that the image of the help screen has not been received, the control unit 350 performs communication NG processing (step S89). In this case, the control unit 350 displays, on the display 334, an alert indicating that, for example, an error has occurred in the communication with the lens-type imaging apparatus 500, and loops to step S73.

As described above, the lens-type imaging apparatus 500 can generate the help screen so that the allocation parameter allocated to each operation unit and the allocatable parameter that is allocatable by each operation unit are associated with the lens exterior drawing, and display the generated help screen on the slate PC 300 which is a control-side device. Consequently, the lens-type imaging apparatus 500 comprising multiple operation units to which functions for changing various parameters can be freely allocated permits the user to recognize, on one screen, which parameter is allocated to which operation unit.

As a result, it is possible to provide an imaging apparatus, a control method of the imaging apparatus, and an imaging system which are more convenient.

In the configuration according to the embodiments described above, the storage unit 57 of the imaging apparatus 100 has the button layout drawing, and the ROM 200c of the lens 200 has the lens exterior drawing. However, this configuration is not a limited configuration. The slate PC 300 may be configured to comprise the button layout drawing and the lens exterior drawing. For example, the application (control application) to control the imaging apparatus 100 or the lens-type imaging apparatus 500 may be configured to comprise the button layout drawing and the lens exterior drawing. In this case, the slate PC 300 can acquire the button layout drawing and the lens exterior drawing when the control application is downloaded from, for example, a server. Moreover, the slate PC 300 may be configured to acquire the button layout drawing and the lens exterior drawing from the imaging apparatus 100 when communicating with the imaging apparatus 100 for initial setting.

The functions described in the embodiments described above are not exclusively configured by use of hardware, and can also be obtained by reading, into a computer, a program in which each of the functions is written by use of software. Each of the functions may be configured by suitably selecting one of software and hardware.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
   operation units to which parameters for imaging are respectively allocated as allocation parameters;
   a parameter control unit which controls the set values of the allocation parameters on the basis of the operation of each of the operation units;
   a screen generating unit which generates a help screen by displaying the allocation parameter corresponding to each of the operation units on an operation unit layout drawing indicating the positions of the operation units on the basis of a parameter database showing the operation unit allocated to each of the allocation parameters;
   a display change judgment unit which judges whether to change the display state of the operation unit layout drawing;
   a display device which displays the help screen; and
   a touch sensor which detects a touch operation on the display device,
   wherein the display change judgment unit judges whether to change the display state in response to the operation by the touch sensor while the help screen is being displayed on the display device, and
   wherein the screen generating unit changes the angle of the operation unit layout drawing when there are operation unit layout drawings drawn from different angles and when the display change judgment unit judges to change the display state.

2. An imaging apparatus comprising:
   operation units to which parameters for imaging are respectively allocated as allocation parameters;
   a parameter control unit which controls the set values of the allocation parameters on the basis of the operation of each of the operation units;
   a screen generating unit which generates a help screen by displaying the allocation parameter corresponding to each of the operation units on an operation unit layout drawing indicating the positions of the operation units on the basis of a parameter database showing the operation unit allocated to each of the allocation parameters;
   a display device which displays the help screen; and
   a touch sensor which detects a touch operation on the display device,
   wherein the parameter control unit controls the set values of the allocation parameters in response to the operation by the touch sensor while the help screen is being displayed on the display device.

3. The imaging apparatus according to claim 2, wherein the parameter database associates and holds, for each of the allocation parameters, information respectively indicating a parameter name, the operation unit to which the allocation parameter is allocated, the operation unit layout drawing showing this operation unit, and an operation unit position indicating the position of this operation unit on the operation unit layout drawing, and
the screen generating unit displays the parameter name at the position indicated by the operation unit position on the operation unit layout drawing which is indicated by the parameter database.

4. The imaging apparatus according to claim 2, wherein the screen generating unit further displays, in the help screen, allocatable parameters that are allocatable to the operation units in association with the operation units on the operation unit layout drawing.

5. The imaging apparatus according to claim 2, wherein when the operation units are operation units which receive rotational operations, the screen generating unit further shows, in the help screen, how the allocation parameters are changed in response to the rotational operations of the operation units.

6. A control method of an imaging apparatus comprising operation units to which parameters for imaging are respectively allocated as allocation parameters, a parameter control unit which controls the set values of the allocation parameters on the basis of the operation of each of the operation units, a display device which displays a help screen, a touch sensor which detects a touch operation on the display device, and a screen generating unit which generates the help screen, the method comprising:
   the screen generating unit generates a help screen by displaying the allocation parameter corresponding to each of the operation units on an operation unit layout drawing indicating the positions of the operation units on the basis of a parameter database showing the operation unit allocated to each of the allocation parameters; and
   the parameter control unit controls the set values of the allocation parameters in response to the operation by the touch sensor while the help screen is being displayed on the display device.

7. A control method comprising:
   allocating to operation units of an imaging apparatus, respective parameters for imaging as allocation parameters;
   controlling set values of the allocation parameters on the basis of an operation of each of the operation units;
   generating, with a screen generation unit, a help screen by displaying the allocation parameter corresponding to each of the operation units on an operation unit layout drawing indicating the positions of the operation units on the basis of a parameter database showing the operation unit allocated to each of the allocation parameters;
   displaying, with a display device, the help screen;
   detecting, with a touch sensor, a touch operation on the display device; and
   controlling the set values of the allocation parameters in response to the operation by the touch sensor while the help screen is being displayed on the display device.

* * * * *